(12) United States Patent
Hwang et al.

(10) Patent No.: US 11,343,712 B2
(45) Date of Patent: May 24, 2022

(54) V2X COMMUNICATION DEVICE AND V2X COMMUNICATION METHOD OF V2X COMMUNICATION DEVICE

(71) Applicant: LG ELECTRONICS INC., Seoul (KR)

(72) Inventors: Jaeho Hwang, Seoul (KR); Woosuk Ko, Seoul (KR); Jinwoo Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 163 days.

(21) Appl. No.: 16/967,124

(22) PCT Filed: Feb. 9, 2018

(86) PCT No.: PCT/KR2018/001768
§ 371 (c)(1),
(2) Date: Aug. 3, 2020

(87) PCT Pub. No.: WO2019/156266
PCT Pub. Date: Aug. 15, 2019

(65) Prior Publication Data
US 2020/0367096 A1 Nov. 19, 2020

(51) Int. Cl.
*H04W 28/02* (2009.01)
*H04W 4/40* (2018.01)
*H04W 74/08* (2009.01)

(52) U.S. Cl.
CPC ......... *H04W 28/0289* (2013.01); *H04W 4/40* (2018.02); *H04W 74/0808* (2013.01)

(58) Field of Classification Search
CPC ............. H04W 4/40–48; H04W 16/08; H04W 28/0284; H04W 28/0289; H04W 36/22;
(Continued)

(56) References Cited

U.S. PATENT DOCUMENTS 9,521,575 B2   12/2016 Bai
9,692,704 B2   6/2017 Srinivasan et al.
(Continued)

FOREIGN PATENT DOCUMENTS

CN   105338497       2/2016
CN   110087211 A  *  8/2019  ........... H04B 17/309
(Continued)

OTHER PUBLICATIONS

PCT International Application No. PCT/KR2018/001768, International Search Report dated Nov. 9, 2018, 3 pages.

*Primary Examiner* — Thomas R Cairns
(74) *Attorney, Agent, or Firm* — Lee, Hong, Degerman, Kang & Waimey PC

(57) ABSTRACT

Disclosed is a method for receiving a V2X message by a V2X communication device. A method for transmitting a V2X message comprises the steps of: acquiring CBR information indicating a congestion state of a channel; determining a state and substate of a channel for a distributed congestion control (DCC) on the basis of the CBR information; on the basis of the state and substate state, generating transmission period information and transmission structure information for the V2X message; and generating the V2X message on the basis of the transmission period information and the transmission structure information. Here, the transmission period information indicates a transmission period of the V2X message, and the transmission structure information indicates a structure of the V2X message transmitted in the transmission period.

14 Claims, 25 Drawing Sheets

(58) Field of Classification Search
CPC . H04W 43/00; H04W 72/12; H04W 72/1221; H04W 72/1252; H04W 74/0808–0825
See application file for complete search history.

(56) References Cited

U.S. PATENT DOCUMENTS

| | | | |
|---|---|---|---|
| 10,383,023 B1 * | 8/2019 | Hahn | H04W 36/22 |
| 10,447,596 B2 * | 10/2019 | Gulati | H04W 52/346 |
| 2017/0188391 A1 | 6/2017 | Rajagopal et al. | |
| 2020/0344643 A1 * | 10/2020 | Zhou | H04W 28/0231 |

FOREIGN PATENT DOCUMENTS

| | | | | |
|---|---|---|---|---|
| EP | 2801230 | | 11/2016 | |
| EP | 3399780 A1 * | | 11/2018 | H04L 43/0894 |
| EP | 3846575 A1 * | | 7/2021 | H04W 4/40 |
| EP | 3497963 B1 * | | 9/2021 | H04L 43/12 |
| WO | WO-2018084590 A1 * | | 5/2018 | H04L 47/11 |
| WO | WO-2019064228 A2 * | | 4/2019 | H04L 5/003 |
| WO | WO-2019137622 A1 * | | 7/2019 | H04L 47/14 |

\* cited by examiner

【Figure 1】
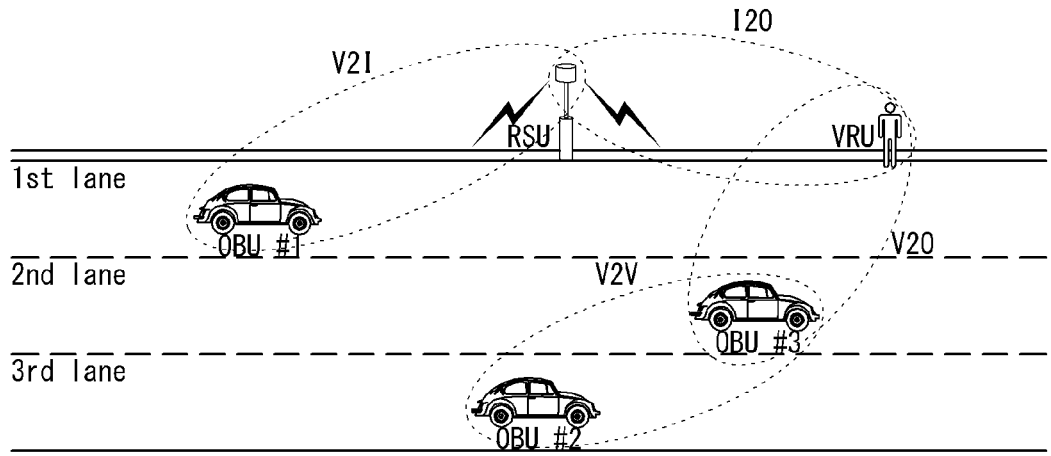
【Figure 2】
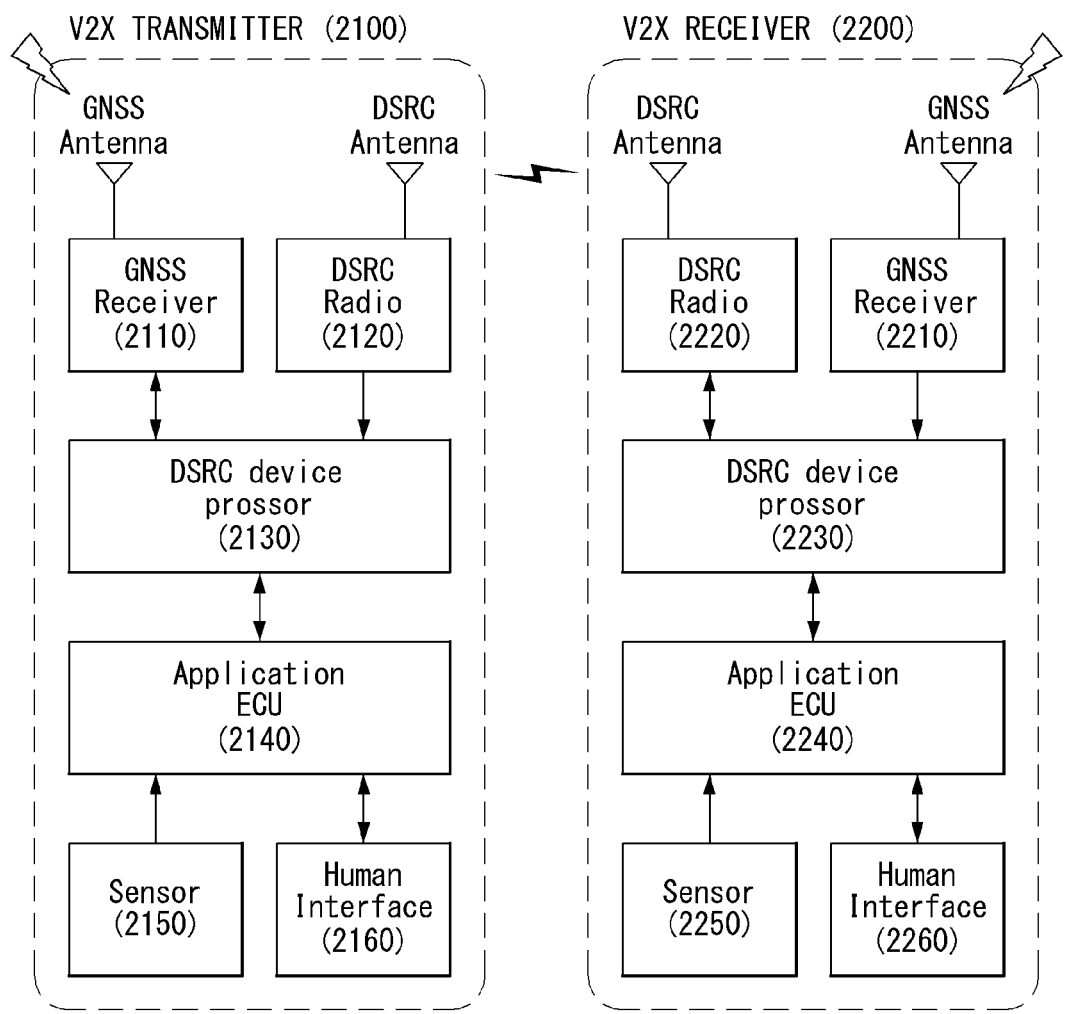

[Figure 3]
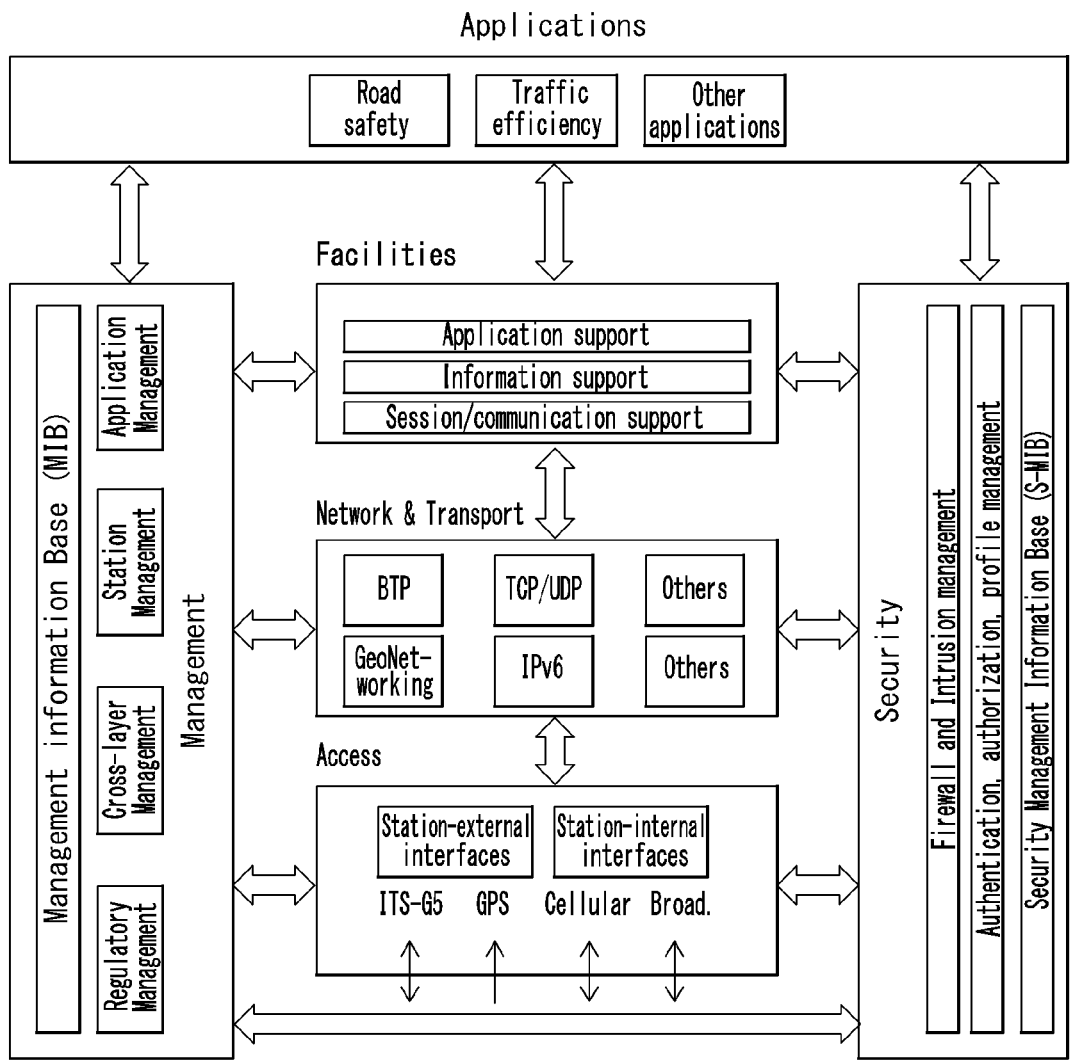

[Figure 4]
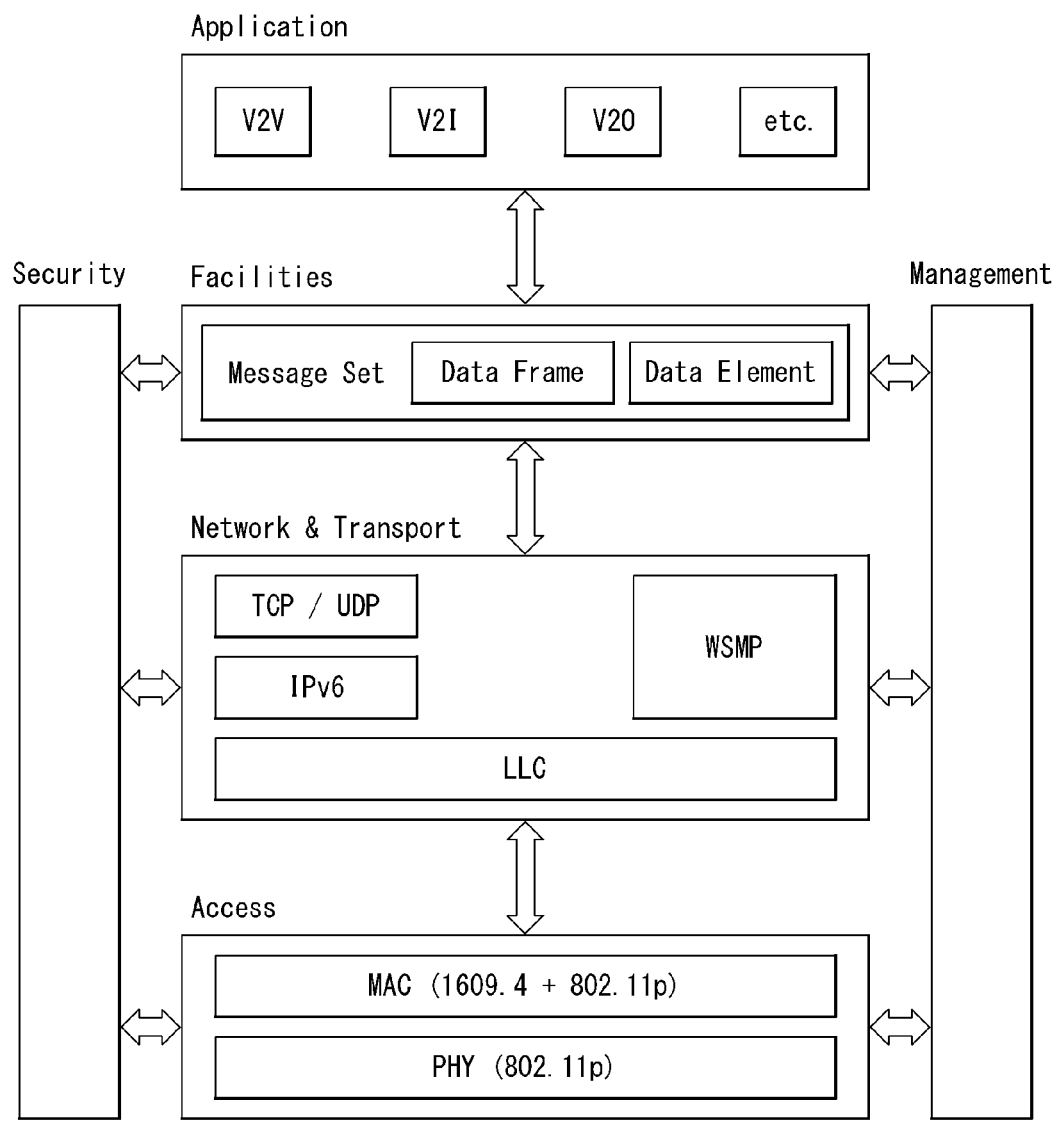

[Figure 5]
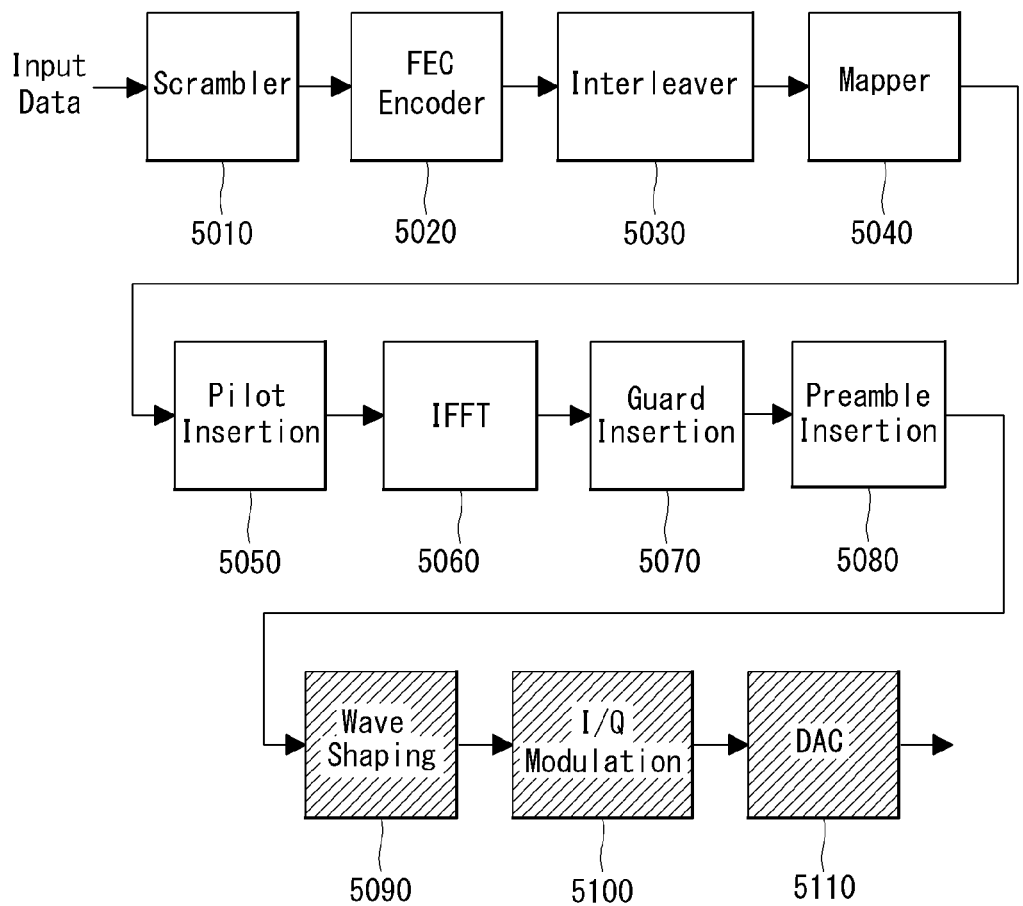
[Figure 6]
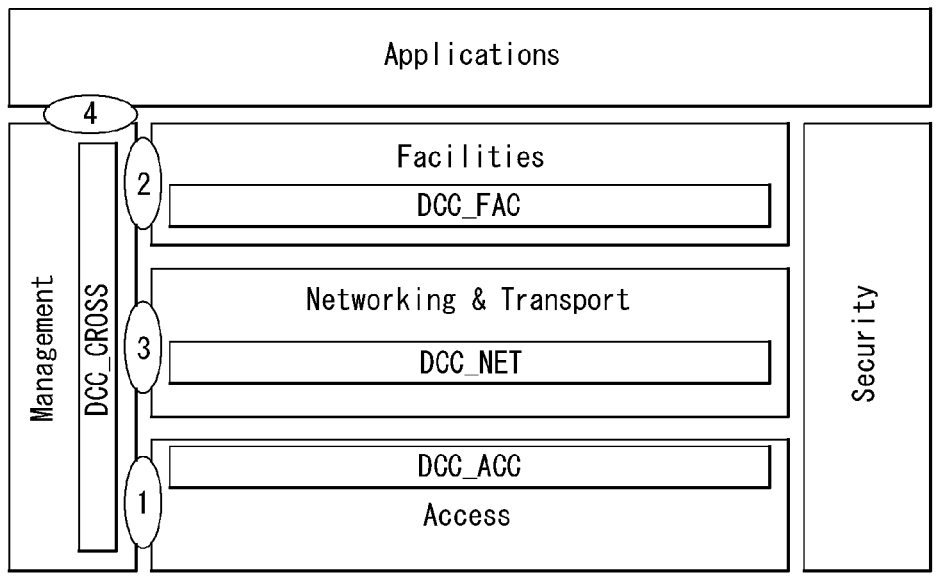

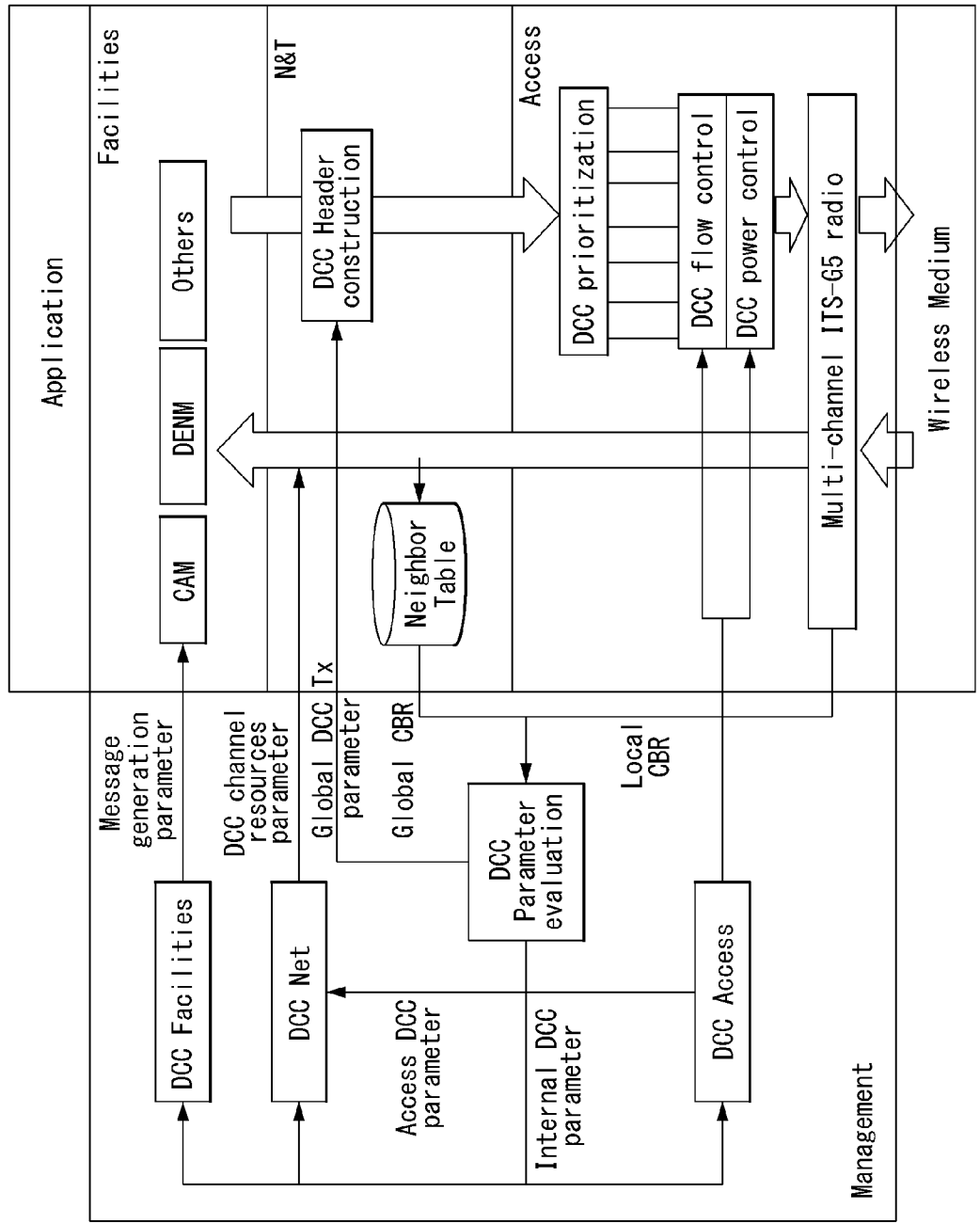
[Figure 7]

【Figure 8】
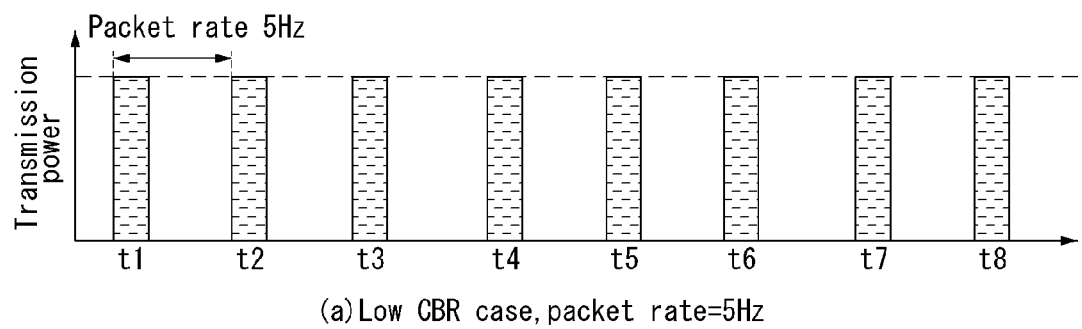
(a) Low CBR case, packet rate=5Hz
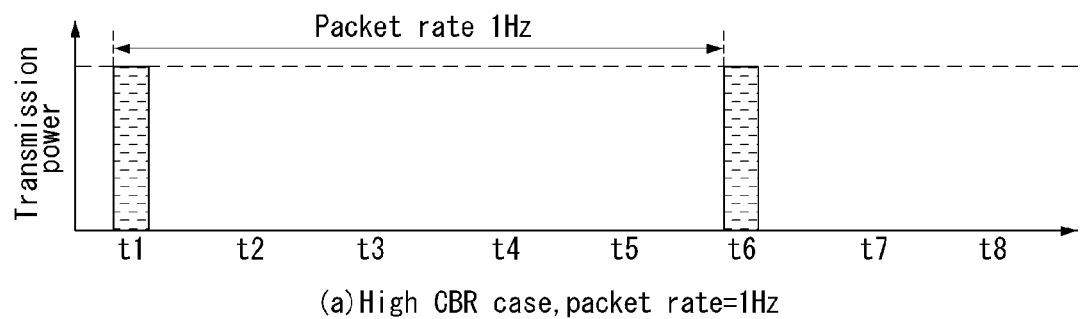
(a) High CBR case, packet rate=1Hz

[Figure 9]
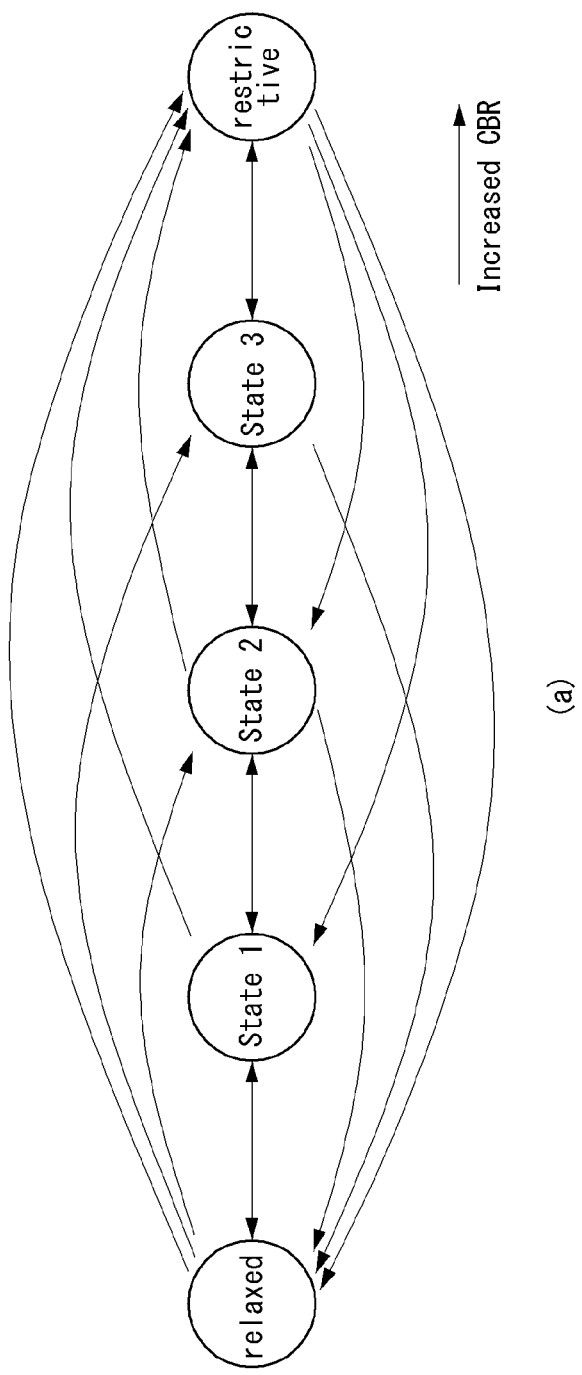

[Figure 10]
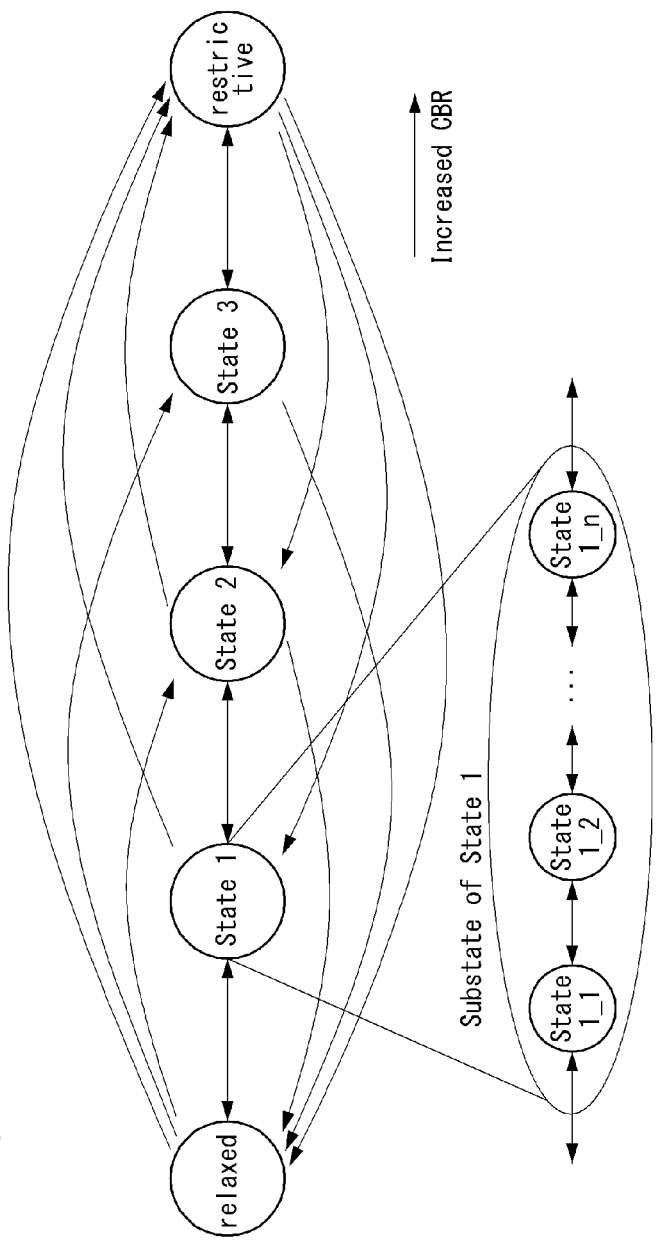

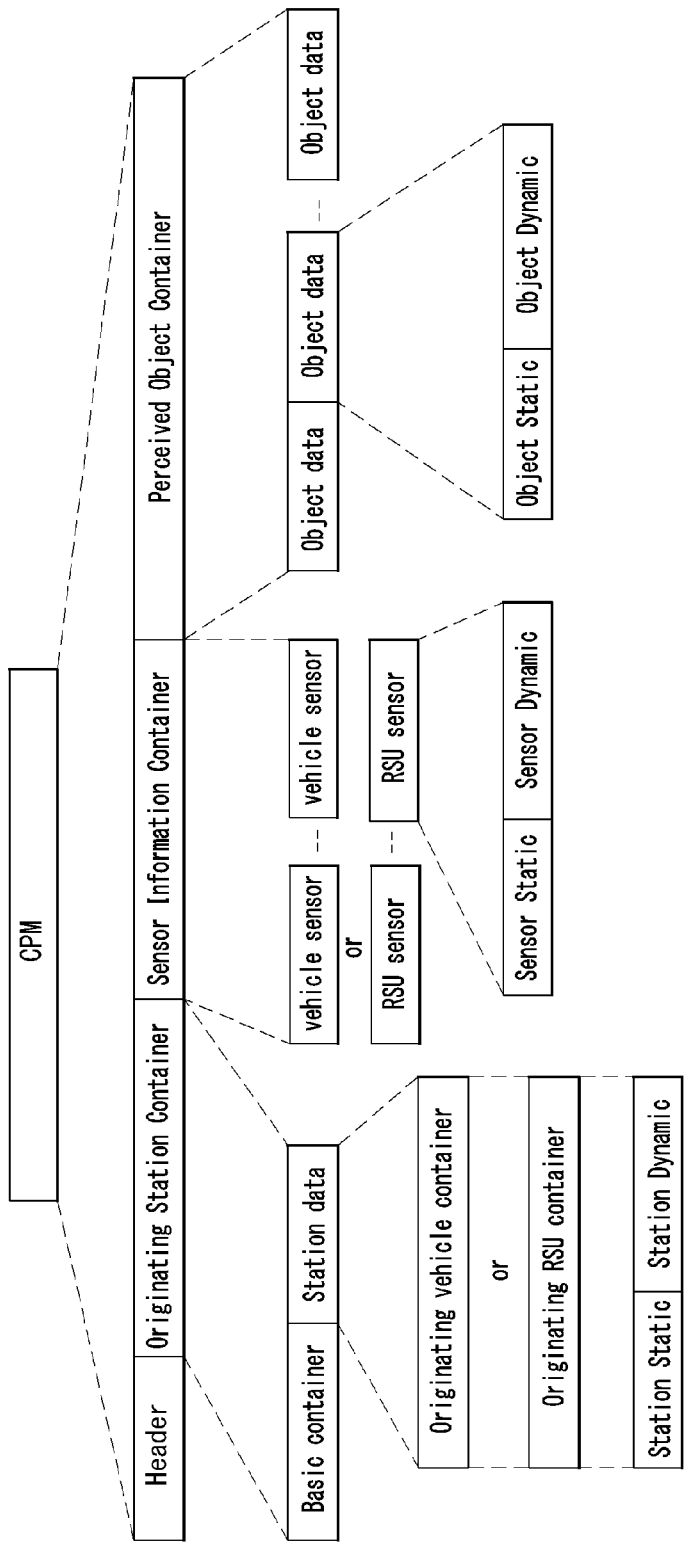
[Figure 11a]

[Figure 11b]

| Header | Basic container | Station Static | Station Dynamic | Sensor Static | Sensor Dynamic | Object Static | Object Dynamic |
|---|---|---|---|---|---|---|---|

OSC: Basic container, Station Static, Station Dynamic
SIC: Sensor Static, Sensor Dynamic
POC: Object Static, Object Dynamic

[Figure 11c]
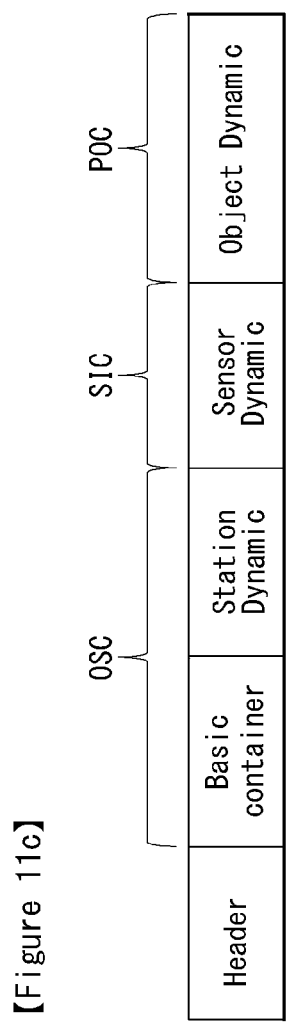

[Figure 12]
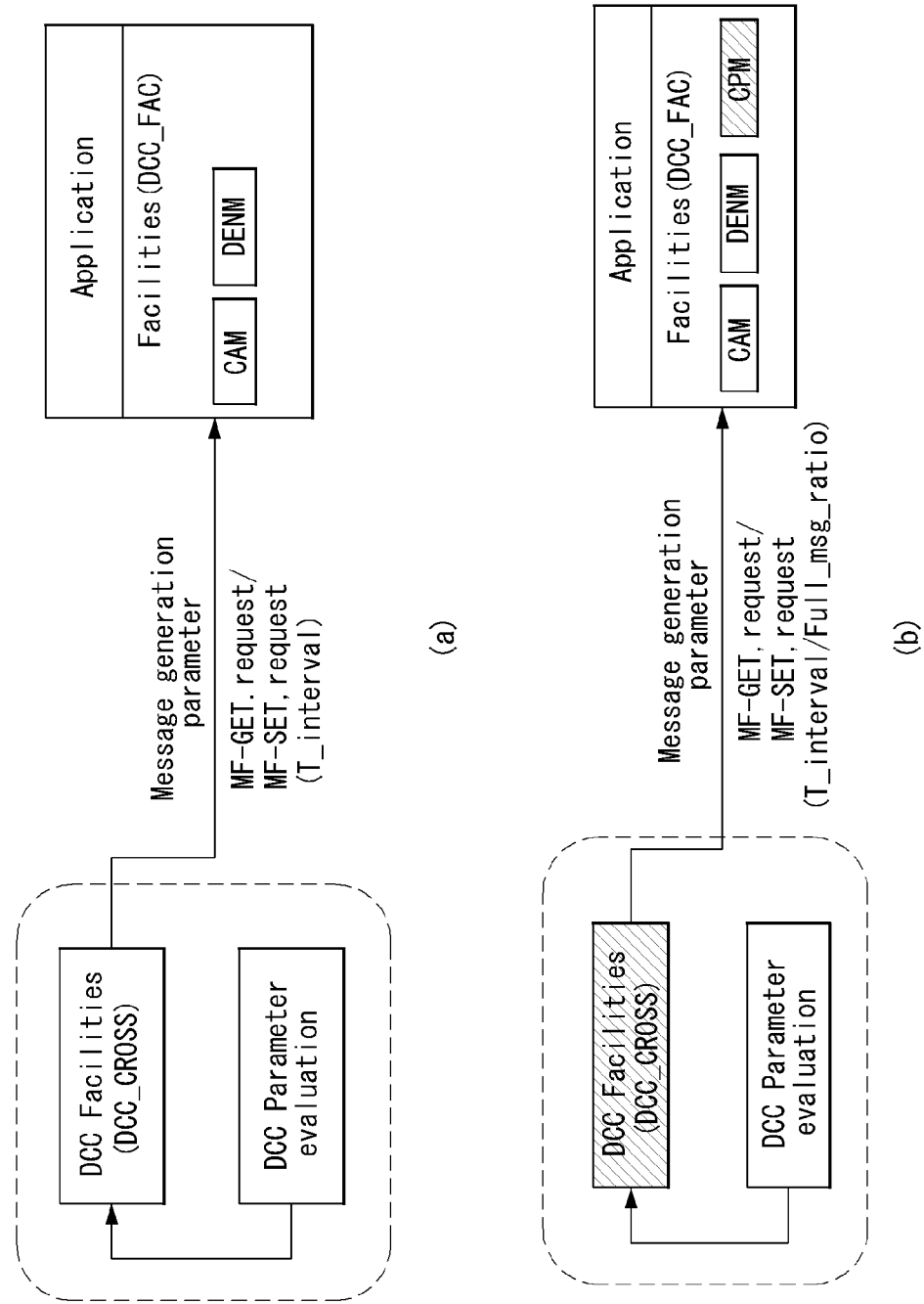

[Figure 13]
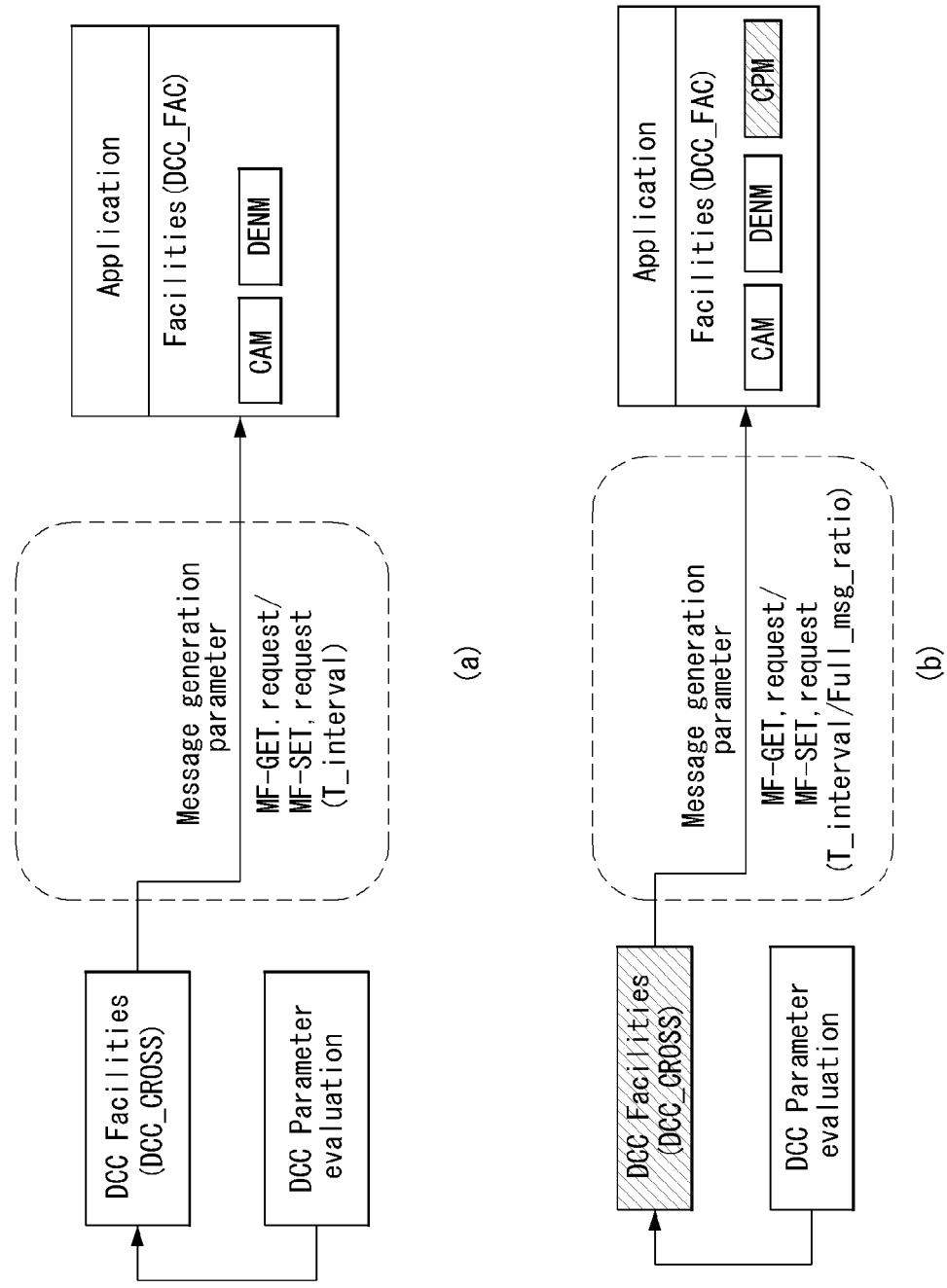

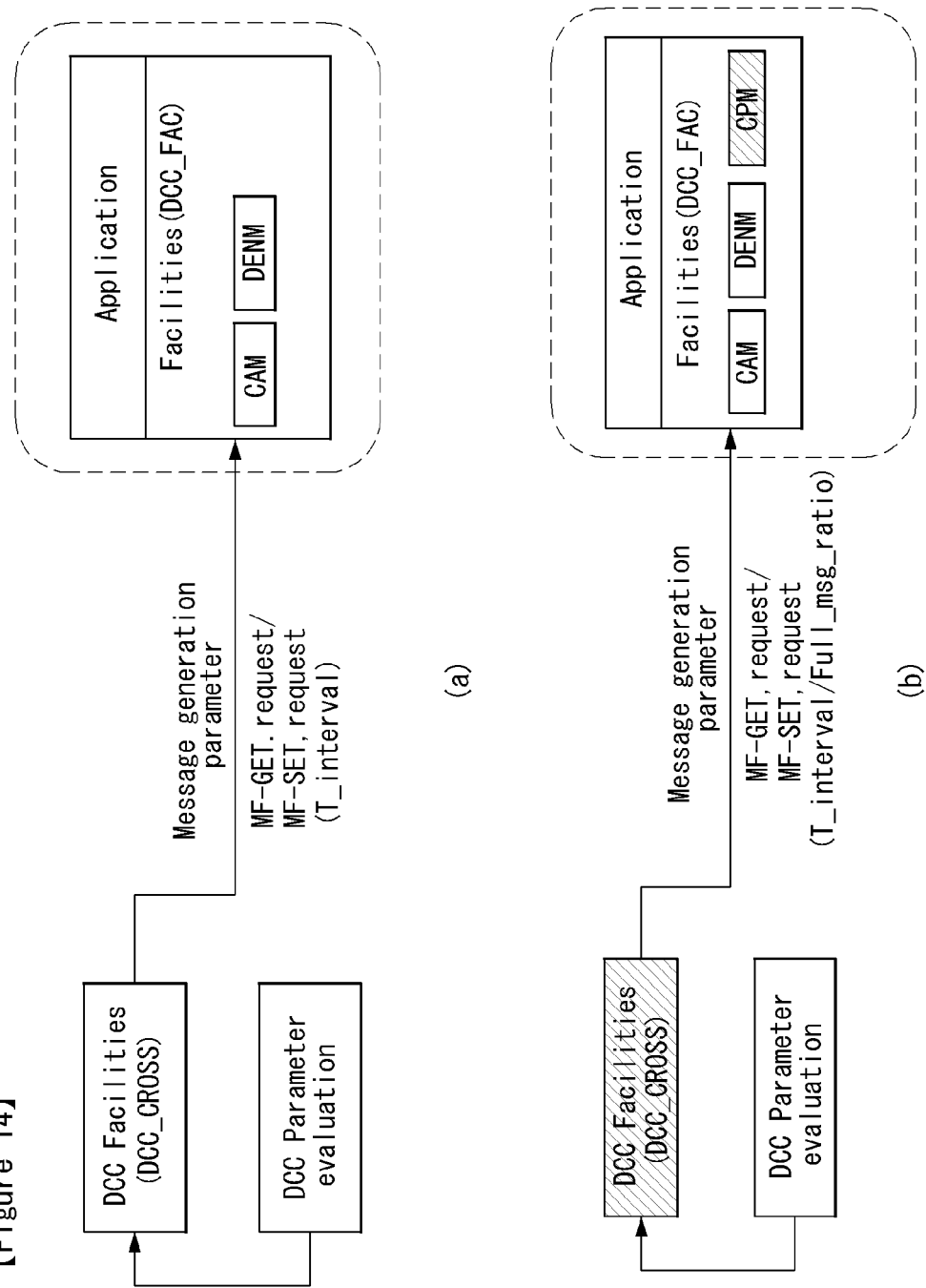

[Figure 15]
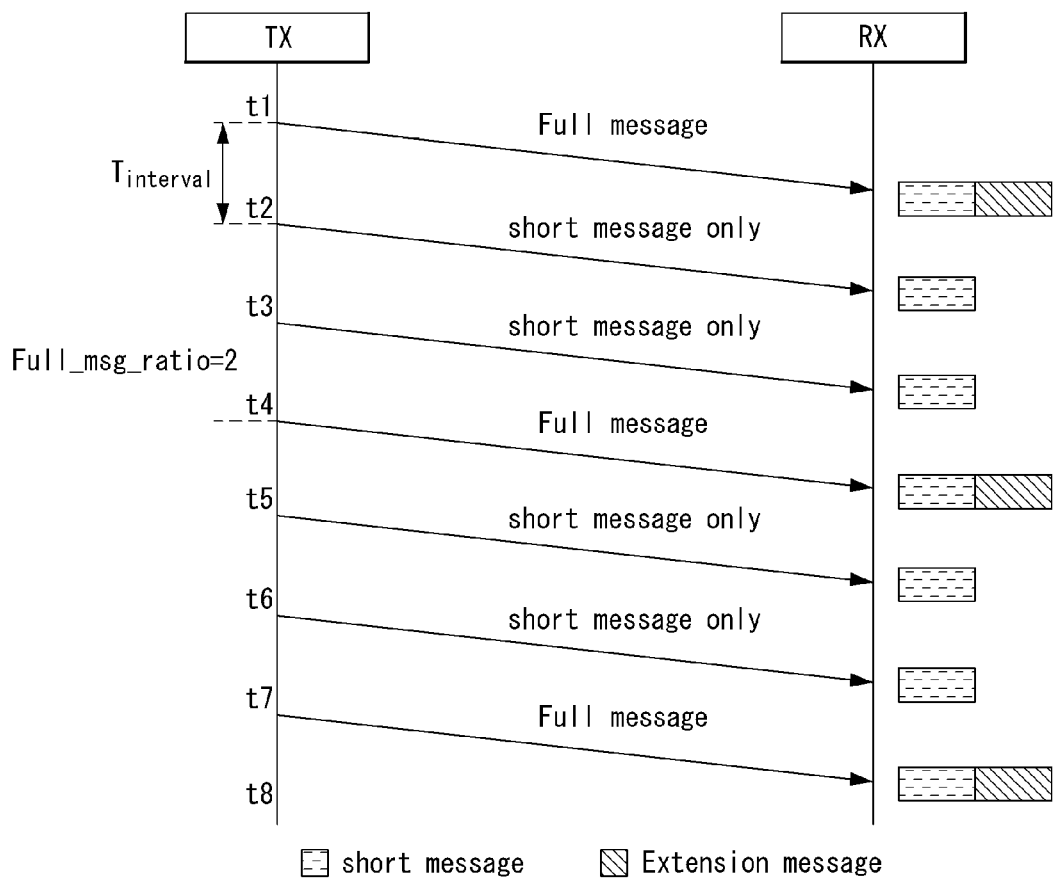

[Figure 16]
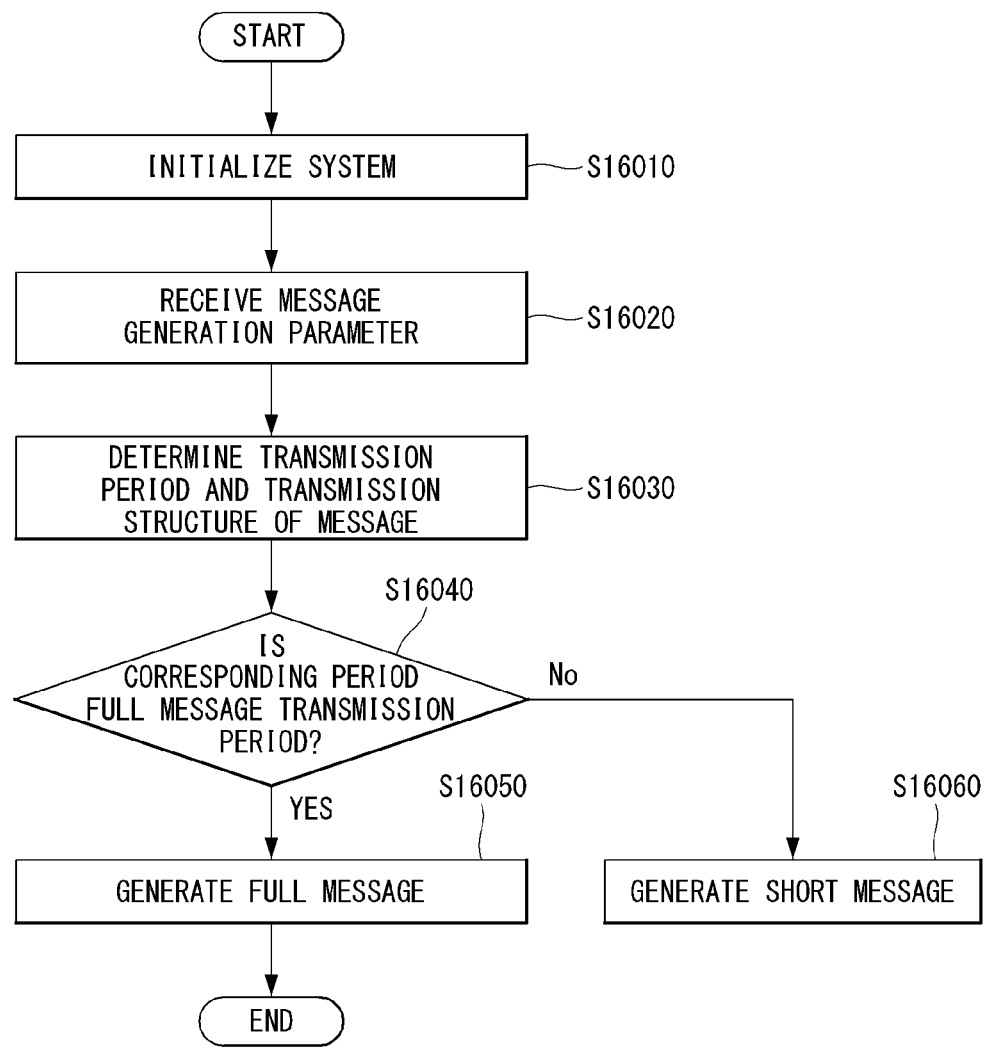

[Figure 17a]
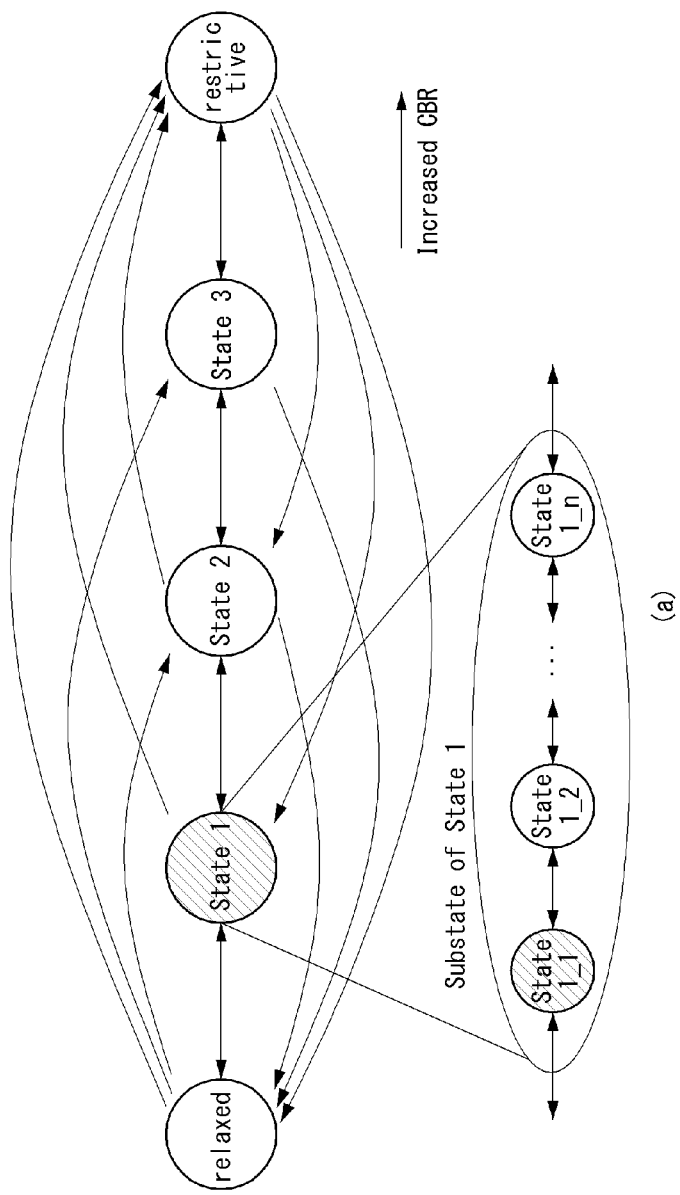

【Figure 17b】
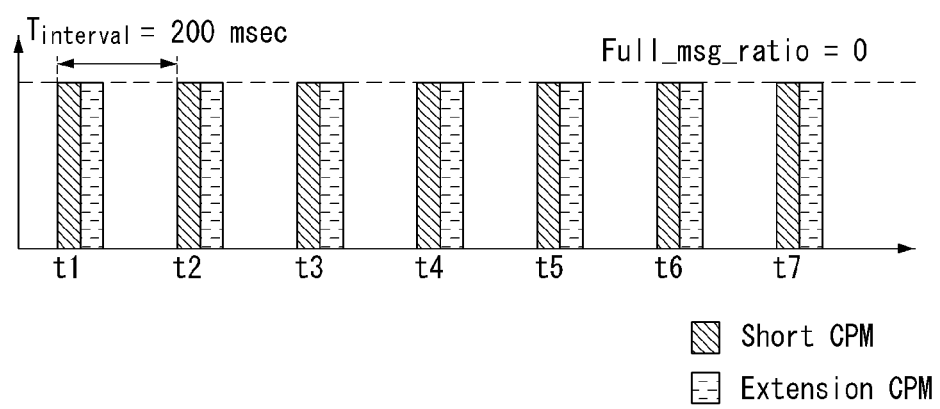

[Figure 18a]
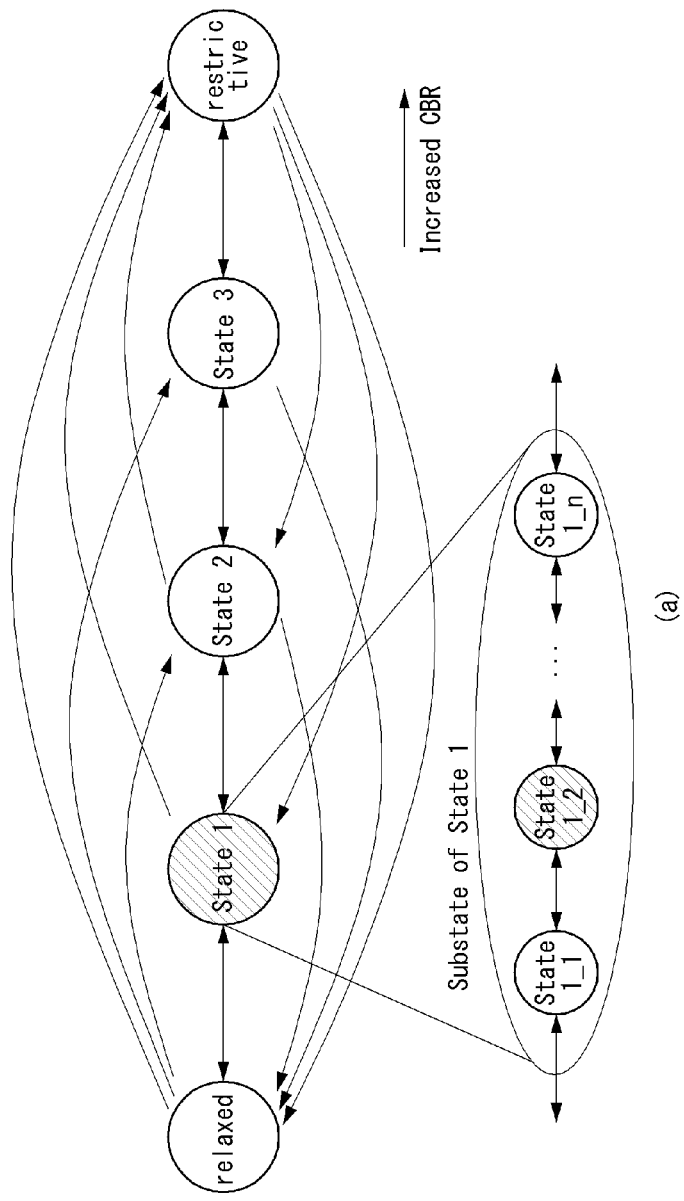

【Figure 18b】
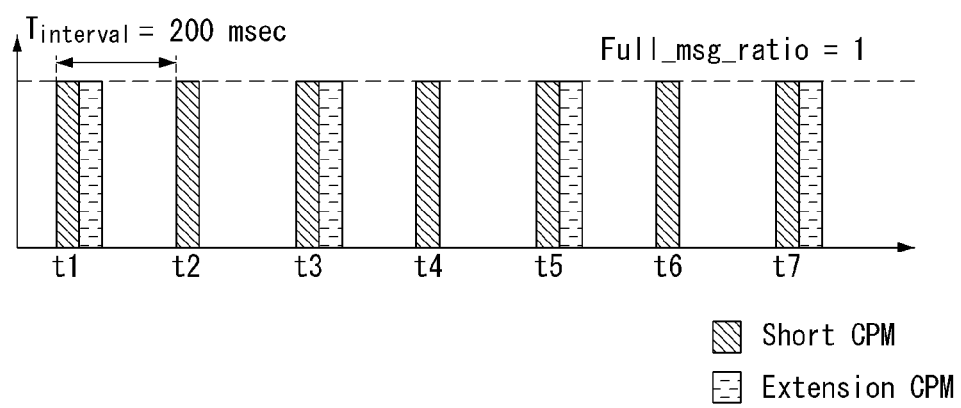

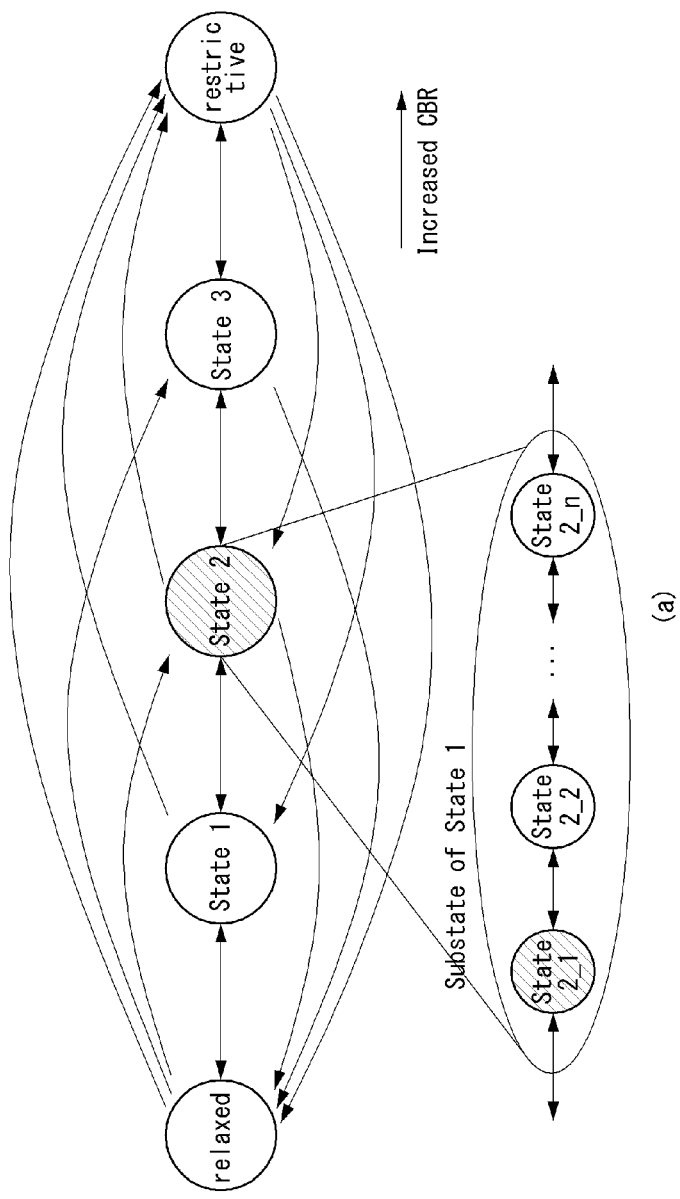
[Figure 19a]

【Figure 19b】
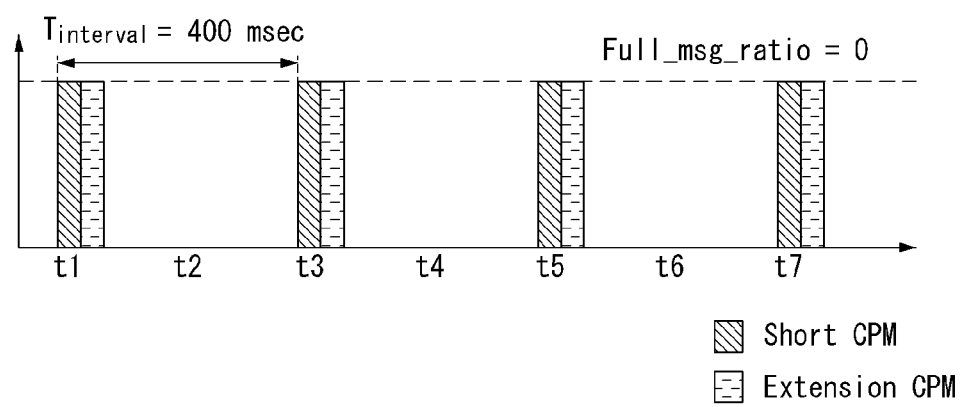

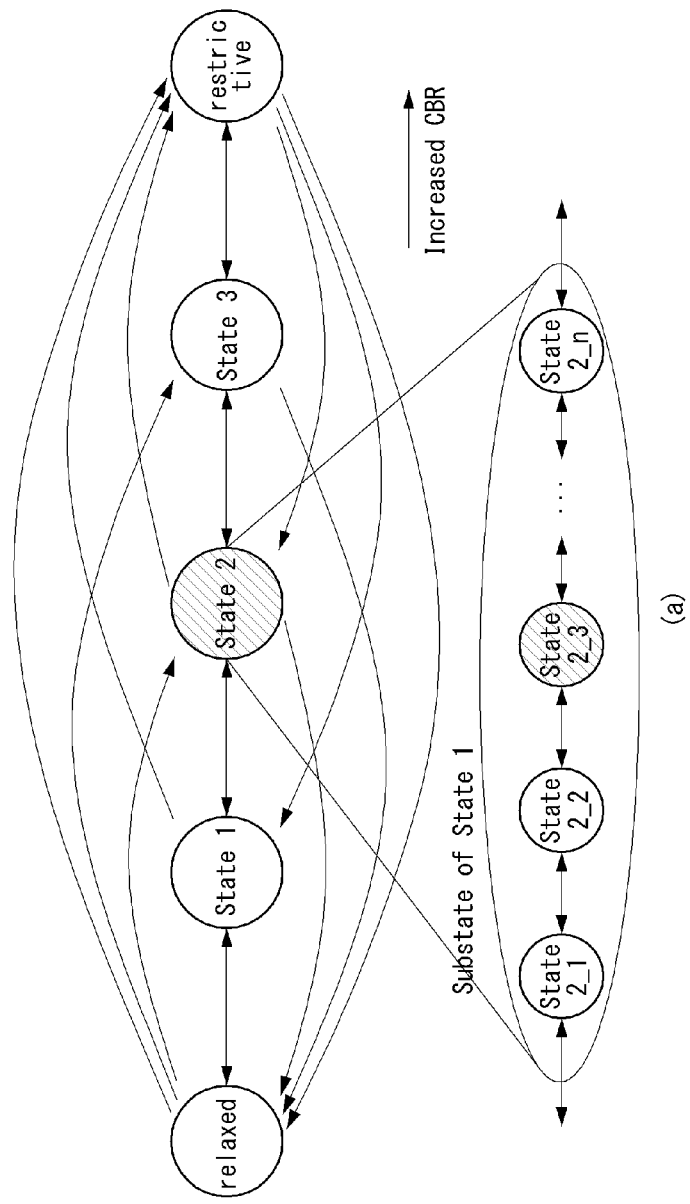
[Figure 20a]

[Figure 20b]
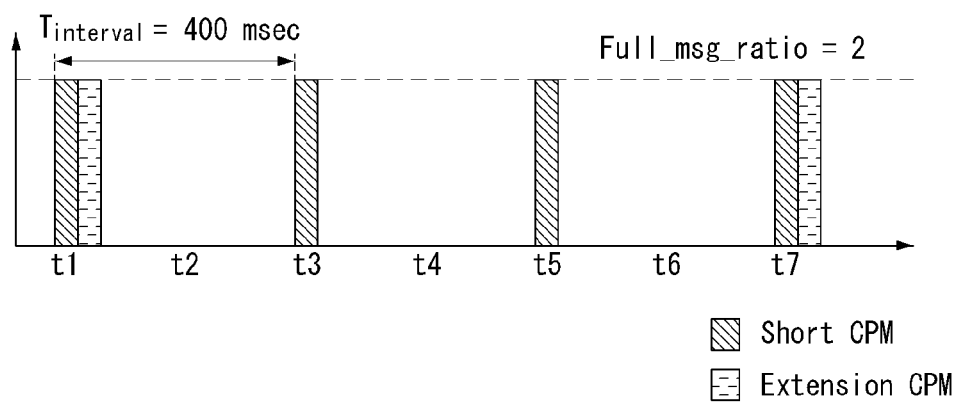
[Figure 21]
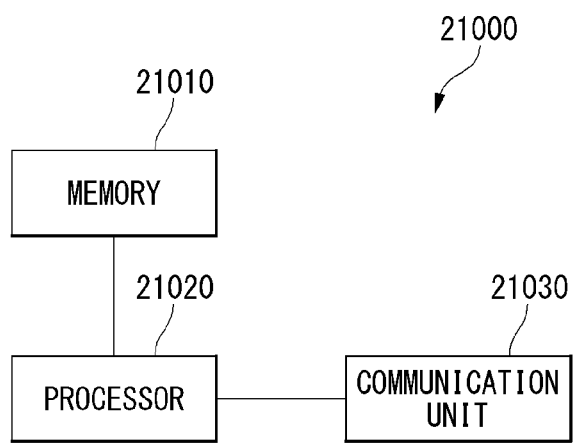

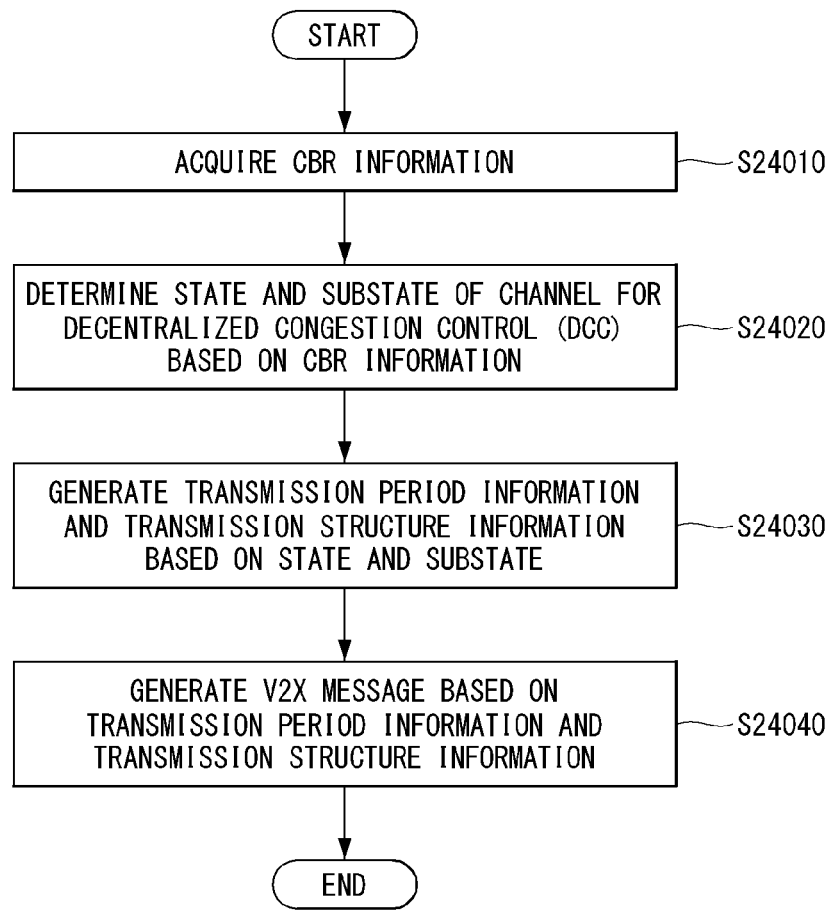
[Figure 22]

V2X COMMUNICATION DEVICE AND V2X COMMUNICATION METHOD OF V2X COMMUNICATION DEVICE

CROSS-REFERENCE TO RELATED APPLICATIONS

This application is the National Stage filing under 35 U.S.C. 371 of International Application No. PCT/KR2018/001768, filed on Feb. 9, 2018, the contents of which are all hereby incorporated by reference herein in its entirety.

TECHNICAL FIELD

The present disclosure relates to a V2X communication device and a V2X communication method thereof, and particularly, to a V2X communication method considering a channel state.

BACKGROUND ART

In recent years, vehicles have become a result of complex industrial technology, which is a fusion of electric, electronic and communication technologies, from centering on mechanical engineering, and the vehicle is also called a smart car in such an aspect. Smart cars have been providing various customized mobile services as well as traditional vehicle technology such as traffic safety/complicatedness by connecting drivers, vehicles, and transportation infrastructures. The connectivity may be implemented using vehicle to everything (V2X) communication technology.

DISCLOSURE

Technical Problem

Various services may be provided through V2X communication. Furthermore, a plurality of frequency bands is used in order to provide various services. Even in such an environment, it is very important to provide a congestion control method for efficient operation of a wireless channel.

Technical Solution

In order to solve the technical problem, the present disclosure proposes a method for receiving an ITS message by a V2X communication device.

A method for transmitting a V2X message by a V2X communication device according to an embodiment of the present disclosure includes: acquiring CBR information indicating a congestion state of a channel; determining a state and substate of a channel for a distributed congestion control (DCC) based on the CBR information; generating transmission period information and transmission structure information for the V2X message based on the state and substate; and generating the V2X message based on the transmission period information and the transmission structure information, in which the transmission period information may indicate a transmission period of the V2X message and the transmission structure information may indicate a structure of the V2X message transmitted in the transmission period.

A V2X communication device transmitting a V2X message according to an embodiment of the present disclosure includes: at least one communication unit transmitting/receiving a V2X message; and a processor controlling the communication unit, in which the processor may include acquiring CBR information indicating a congestion state of a channel, determining a state and substate of a channel for a distributed congestion control (DCC) based on the CBR information, generating transmission period information and transmission structure information for the V2X message based on the state and substate, and generating the V2X message based on the transmission period information and the transmission structure information, and the transmission period information may indicate a transmission period of the V2X message and the transmission structure information may indicate a structure of the V2X message transmitted in the transmission period.

As the embodiment, the generating of the transmission period information and the transmission structure information may include generating the transmission period information by determining a predetermined transmission period corresponding to the state, and generating the transmission structure information by determining a predetermined transmission structure corresponding to the substate in the state.

As the embodiment, the structure of the V2X message may include a full message structure including dynamic data and static data of the V2X message and a short message structure including only the dynamic data.

As the embodiment, the transmission structure information may provide a transmission ratio indicating how many times a V2X message of the short message structure is transmitted per transmission of a V2X message of the full message structure.

As the embodiment, the generating of the V2X message may include transmitting the V2X message of the full message structure and the V2X message of the short message structure in the transmission period based on the transmission ratio.

As the embodiment, the method for transmitting a V2X message may further include delivering, by a facility layer entity, a request primitive for requesting the transmission period information and the transmission structure information to a management layer entity.

As the embodiment, the management layer may deliver a request message including the transmission period information and the transmission structure information to the facility layer through an interface between the management layer and the facility layer.

As the embodiment, the request primitive may include ID information for identifying a facility layer and parameter information for a parameter requested through the request primitive, and the parameter information may include the transmission period information and the transmission structure information.

Advantageous Effects

According to the present disclosure, a V2X communication device can adjust both a transmission period and a transmission structure of a V2X message by considering a congestion state of a channel. Therefore, the V2X communication device may operate a message transmission scheme which is flexibly changed according to a state of the channel and perform efficient decentralized congestion control (DCC).

Various other additional effects of the present disclosure will be described together with a configuration of the present disclosure.

DESCRIPTION OF DRAWINGS

The accompanying drawings, which are included to provide a further understanding of the present disclosure are incorporated in and constitute a part of this application, illustrate embodiments of the present disclosure together with the detailed description serving to describe the principle of the present disclosure.

FIG. 1 illustrates an intelligent transport system (ITS) according to an embodiment of the present disclosure.

FIG. 2 illustrates a V2X transmission/reception system according to an embodiment of the present disclosure.

FIG. 3 illustrates a configuration of a V2X system according to an embodiment of the present disclosure.

FIG. 4 illustrates a configuration of a V2X system according to another embodiment of the present disclosure.

FIG. 5 illustrates a physical layer configuration of a V2X transmission device according to an embodiment of the present disclosure.

FIG. 6 illustrates a DCC architecture according to an embodiment of the present disclosure.

FIG. 7 illustrates an overview of DCC in an ITS-S according to an embodiment of the present disclosure.

FIG. 8 illustrates a method for transmitting a message based on CBR information by an ITS-S according to an embodiment of the present disclosure.

FIG. 9 illustrates a state based reactive DCC algorithm according to an embodiment of the present disclosure.

FIG. 10 illustrates a multi-layer state based reactive DCC algorithm according to an embodiment of the present disclosure.

FIGS. 11a, 11b and 11c illustrate examples of an ITS message to which a multi-layer state based reactive DCC algorithm is applied according to an embodiment of the present disclosure.

FIG. 12 illustrates a structure of a management layer for DCC according to the present disclosure.

FIG. 13 illustrates a structure of an interface between a management layer and a facility layer for DCC according to an embodiment of the present disclosure.

FIG. 14 illustrates a structure of a facility layer for DCC according to an embodiment of the present disclosure.

FIG. 15 illustrates a method in which an ITS-S using multi-layer state based reactive DCC transmits/receives an ITS message according to an embodiment of the present disclosure.

FIG. 16 illustrates a method in which an ITS-S using multi-layer state based reactive DCC generates an ITS message through facility layer processing according to an embodiment of the present disclosure.

FIGS. 17a and 17b illustrate a first embodiment in which an ITS-S using multi-layer state based reactive DCC transmits an ITS message according to a state and a substate according to an embodiment of the present disclosure.

FIGS. 18a and 18b illustrate a second embodiment in which an ITS-S using multi-layer state based reactive DCC transmits an ITS message according to a state and a substate according to an embodiment of the present disclosure.

FIGS. 19a and 19b illustrate a second embodiment in which an ITS-S using multi-layer state based reactive DCC transmits an ITS message according to a state and a substate according to an embodiment of the present disclosure.

FIGS. 20a and 20b illustrate a second embodiment in which an ITS-S using multi-layer state based reactive DCC transmits an ITS message according to a state and a substate according to an embodiment of the present disclosure.

FIG. 21 illustrates a configuration of a V2X communication device according to an embodiment of the present disclosure.

FIG. 22 illustrates a method for transmitting a V2X message by a V2X communication device according to an embodiment of the present disclosure.

BEST MODE

Preferred embodiments of the disclosure are described in detail and examples thereof are illustrated in the accompanying drawings. The following detailed description with reference to the accompanying drawings is intended to illustrate the preferred embodiments of the disclosure rather than merely illustrating embodiments that may be implemented according to embodiments of the disclosure. The following detailed description includes details in order to provide a thorough understanding of the disclosure, but the disclosure does not require all these details. In the disclosure, respective embodiments described below need not be particularly used separately. Multiple embodiments or all embodiments may be used together, and specific embodiments may be used as a combination.

Most of the terms used in the disclosure are selected from the general ones that are widely used in the field, but some terms are arbitrarily selected by the applicant and the meaning thereof will be described in detail in the following description as necessary. Accordingly, the disclosure should be understood based on the intended meaning of the term rather than the mere name or meaning of the term.

The disclosure relates to a V2X communication apparatus and the V2X communication apparatus is included in an Intelligent Transport System (ITS) to perform all or some functions of the ITS. The V2X communication apparatus may communicate with vehicles and vehicles, vehicles and infrastructure, vehicles and bicycles, and mobile devices. The V2X communication apparatus may be abbreviated as a V2X apparatus. As an embodiment, the V2X apparatus may correspond to an on board unit (OBU) of the vehicle or may be included in the OBU. The OBU may also be referred to as on a board equipment (OBE). The V2X apparatus may correspond to a road side unit (RSU) of the infrastructure or may be included in the RSU. The RSU may also be referred to as a road side equipment (RSE). Alternatively, the V2X communication apparatus may correspond to an ITS station or may be included in the ITS station. All of a predetermined OBU, a predetermined RSU, and a predetermined mobile equipment that perform V2X communication may also be referred to as the ITS station or the V2X communication apparatus.

FIG. 1 illustrates an intelligent transport system (ITS) according to an embodiment of the disclosure.

Intelligent transport system means a system to provide efficient and safe transport services by applying information and communication technology, such as electronic control and communication devices, to traffic facilities installed around roads, such as traffic signals or electronic road signs, and means of transportation, such as vehicles, buses, or trains. To support an ITS, vehicle to everything (V2X) technology may be used. V2X communication technology refers to technology of communication between vehicles or between a vehicle and a device around the vehicle.

A vehicle supporting V2X communication is equipped with an OBU. The OBU includes a dedicated short-range communication (DSRC) communication modem. An infra structure including V2X modules installed around a road, such as traffic signals, may be denoted an RSU. Vulnerable road users (VRU) are vulnerable users at risk in traffic, such as pedestrians, bicycles, or wheelchairs. VRUs are capable of V2X communication.

Vehicle to vehicle (V2V) denotes communication between V2X communication device-equipped vehicles or technology for such communication. Vehicle to infra-structure (V2I) denotes communication between a V2X communication device-equipped vehicle and an infrastructure or technology for such communication. Besides, communication between a vehicle and a VRU may be denoted V2O, and communication between an infrastructure and a VRU may be denoted I2O.

FIG. 2 illustrates a V2X transmission/reception system according to an embodiment of the disclosure.

A V2X transmission/reception system includes a V2X transmitter 2100 and a V2X receiver 2200. The V2X transmitter 2100 and the V2X receiver 2200 are so termed depending on their role of data transmission or data reception, and no difference in device configuration exists therebetween. The V2X transmitter 2100 and the V2X receiver 2200 both correspond to a V2X communication device.

The V2X transmitter 2100 includes a global navigation satellite system (GNSS) receiver 2110, a DSRC radio 2120, a DSRC device processor 2130, an application electronic control unit (ECU) 2140, a sensor 2150, and a human interface 2160.

The DSRC radio 2120 may perform communication based on wireless local area network (WLAN)-based IEEE 802.11 standards and/or the wireless access in vehicular environments (WAVE) of the society of automotive engineers (SAE), a U.S.-based automotive professional association. The DSRC radio 2120 may perform the operations of the physical layer and the MAC layer.

The DSRC device processor 2130 may decode messages received by, or to be transmitted by, the DSRC radio 2120. The GNSS receiver 2110 may perform GNSS processing and obtain location information and time information. According to an embodiment, the GNSS receiver 2110 may be a global positioning system (GPS) device.

The application ECU 2140 may be a microprocessor for providing a specific application service. The application ECU may be operated/generate a message based on a user input and sensor information to provide a service and may transmit/receive messages using the DSRC device processor. The sensor 2150 may obtain the vehicle state and ambient sensor information. The human interface 2160 may receive user inputs or display/provide messages via an interface, such as an input button or monitor.

The V2X receiver 2200 includes a global navigation satellite system (GNSS) receiver 2210, a DSRC radio 2220, a DSRC device processor 2230, an application electronic control unit (ECU) 2240, a sensor 2250, and a human interface 2260. The above-described configuration of the V2X transmitter 2100 is applied to the configuration of the V2X receiver 2200.

The DSRC radio and the DSRC device processor correspond to an embodiment of a communication unit. The communication unit may perform communication based on cellular communication technology, such as 3GPP or long term evolution (LTE).

FIG. 3 illustrates a configuration of a V2X system according to an embodiment of the disclosure.

According to an embodiment, the V2X system of FIG. 3 may correspond to an ITS station reference architecture defined in ISO 21217/EN302 665. FIG. 3 illustrates an example ITS station based on the reference architecture. FIG. 3 illustrates a hierarchical architecture for end-to-end communication. When messages are communicated between vehicles, the message is transferred down through each layer in the transmission vehicle/ITS system and is transferred up through each layer in the reception vehicle/ITS system. Each layer is described below.

Application layer: The application layer may implement and support various use cases. For example, the application may provide road safety, efficient traffic information, and other application information.

The application layer may classify and define ITS applications and provide services to the end vehicle/user/infrastructure through the lower layers. Applications may be defined/applied per use case or be defined/applied with their use cases grouped into, e.g., road-safety, traffic efficiency, local services, and infotainment. According to an embodiment, the application classification or use cases may be updated when a new application scenario occurs. The layer management may manage and service information related to the operation and security of the application layer. The information and service may be bi-laterally transferred and shared through the interface between management entity and application layer (MAMA) and the interface between security entity and ITS-S applications (SA) or the service access point (SAP) (e.g., MA-SAP or SA-SAP). The transfer of a request from the application layer to the facilities layer or information from the facilities layer to the application layer may be performed via the interface between facilities layer and ITS-S applications (FA) (or FA-SAP).

Facilities layer: The facilities layer may provide support for effectively implementing various use cases defined in the application layer. For example, the facilities layer may perform application support, information support, and session/communication support.

Basically, the facilities layer may support the functions of the top three layers of the OSI model, i.e., the session layer, presentation layer, and application layer. Additionally, the facilities layer may provide such evolved facilities as, e.g., application support, information support, and session/communication support for the ITS system. Facility means a component that provides functionality, information, or data.

Facilities may be classified into common facilities and domain facilities. The common facilities may provide a basic ITS application set and core services or functions necessary for ITS station operations. For example, time management, position management, and service management may be provided. The domain facilities may provide a specific service or function to one or more basic ITS application sets. For example, the domain facilities may provide decentralized notification messages (DENM) for road hazard warning applications (RHW). The domain facilities may be optional and, unless supported by the ITS station, may be not used.

Network/transport layer: The network/transport layer may configure a network for vehicular communication between homogeneous/heterogeneous networks by using various transport protocols and network protocols. For example, the network/transport layer may provide routing with the internet access using the internet protocol, such as TCP/UDP+IPv6. Or, the network/transport layer may configure a vehicle network using a geographical position-based protocol, such as basic transport protocol (BTP)/geonetworking.

The transport layer corresponds to a layer for linking between the services provided by the higher layers (session layer, presentation layer, and application layer) and the lower layers (network layer, data link layer, and physical layer). The transport layer plays a role to provide management so that the data sent from the user arrives precisely at the destination. At the transmission side, the transport layer may segment data into packets in a size suitable for efficient data transmission. At the reception side, the transport layer may merge the received packets back into the original file. According to an embodiment, as the transport protocol, the TCP/UDP may be used, or a transport protocol for the ITS, such as the VTS, may be used.

The network layer may assign a logical address and determine a packet transfer path. The network layer may receive the packets generated from the transport layer and add a network header including the logical address of the destination. As an example packet path design, vehicle-to-vehicle, vehicle-to-fixed station, or fixed station-to-fixed station unicast/broadcast may be taken into consideration. According to an embodiment, as the network protocol for the ITS, the geo-networking, IPv6 networking with mobility support, or IPv6 over geo-networking may be considered.

Access layer: The access layer may transmit messages/data received from the higher layer via a physical channel. For example, the access layer may perform/support data communication based on, e.g., IEEE 802.11 and/or 802.11p standard-based communication technology, IEEE 802.11 and/or 802.11p standard physical transmission technology-based ITS-G5 wireless communication technology, 2G/3G/4G (LTE)/5G wireless cellular communication technology including satellite/wideband wireless mobile communication, DVB-T/T2/ATSC or other wideband terrestrial digital broadcast technology, GPS technology, or IEEE 1609 WAVE technology.

The ITS system for vehicular communication and networking may be organically designed considering various access techniques, network protocols, and communication interfaces to provide various use cases. The role and functions of each layer may be supplemented.

FIG. 4 illustrates a configuration of a V2X system according to another embodiment of the present disclosure.

FIG. 4 illustrates a hierarchical architecture corresponding to another embodiment of the V2X system of FIG. 3. According to an embodiment, the north American V2X system uses IEEE 802.11 PHY and MAC technology and may additionally use IEEE 1609.4 MAC technology. In the network/transport layer technology, IEEE 802.2 standard technology may be applied to the LLC block, and IEEE 1609.3 technology may be applied to the WAVE short message protocol (WSMP). The facilities layer may use the message set of SAE J2735 standard, and the application layer may use the application defined for V2V, V2I, or V2O in the J2945 standard.

The application layer may perform the function of implementing and supporting use cases. The application may be optionally used depending on the use case. The system requirements for each use case may be defined in the J2945 standard. J2945/1 defines the application of V2V technology such as V2V safe communication.

The J2945/1 documentation defines applications such as emergency electronic brake lights (EEBL), forward crash warning (FCW), blind spot warning (BSW), lane change warning (LCW), intersection movement assist (IMA), and control loss warning (CLW). According to an embodiment, FCW technology is V2V safe communication technology that warns of colliding with a vehicle in front. When a V2X communication device-equipped vehicle comes to a sudden stop or stops due to an accident, the vehicle may transmit an FCW safety message to avoid collision with a following vehicle. The following vehicle may receive the FCW message, warn the driver, or control to decelerate or change lanes. In particular, even when another vehicle is between a parked vehicle and a driving vehicle, the state of the parked vehicle may advantageously be grasped via the FCW. The FCW safety message may include the vehicle's location information (latitude, longitude, and lane), vehicle information (kind, length, direction, and speed), event information (stop, sudden stop, and slow-down), and such information may be generated at the request of the facilities layer.

The facilities layer may correspond to OSI layer 5 (session layer), layer 6 (presentation layer), or layer 7 (application layer). The facilities layer may generate a message set depending on the context to support the application. The message set may be defined in the J2735 standard and be specified/decoded via ASN.1. The message set may include a BasicSafetyMessage message, a MapData message, a SPAT message, a CommonSafetyRequest message, an EmergencyVehicleAlert message, an IntersectionCollision message, a ProbeVehicleData message, a RoadSideAlert message, and a PersonalSafetyMessag message.

The facilities layer may compile information to be transmitted from the higher layer, generating a message set. The message set may be displayed in an abstract syntax notation 1 (ASN.1) scheme. ASN.1 is a notation used to specify data architectures and may also define encoding/decoding rules. ASN.1 does not depend upon a specific device, data representation scheme, programming language, or hardware platform. ASN.1 is a language for specifying data regardless of platforms and is the joint standard of CCITT (Consultative Committee on International Telegraphy and Telephony, X.208) and ISO (international Organization for Standardization, ISO 8824).

The message set is a collection of messages related to V2X operation. There is a message set that fits the context of the higher application. The message set may be represented in the format of a data frame and may include at least one element. Each element may include a data frame or data element.

The data frame expresses two or more data listings. The data frame may be a data element listing structure or a data frame listing structure. According to an embodiment, DV_vehicleData is a data frame structure indicating information for the vehicle and may include a plurality of data elements (e.g., Height, Bumbers, mass, or trailerweight). The data element defines a description for the data element. According to an embodiment, the element, Height, as used in the data frame is defined in DE_VehicleHeight and may represent the height of the vehicle. According to an embodiment, the height of the vehicle may be represented from 0 to 127, and the LBS unit is increased on a per-5 cm basis up to 6.35 meters.

According to an embodiment, a BasicSafetyMessage may be transmitted. The BasicSafetyMessage is the most basic, critical message in the message set and is used to periodically transmit the basic information for the vehicle. This message may include coreData defined as BSMcoreData and PartII and regional data which are optional. The coreData may include data elements such as msgCnt, id, lat, long, elev, speed, deading, break, or size. The coreData indicates the message count, ID, latitude, longitude, altitude, speed, direction, brake, and vehicle size by using the data elements. The BSM may transmit the information corresponding to the coreData typically in a period of 100 msec (ten times per second).

The network/transport layer may correspond to OSI layer 3 (network layer) and layer 4 (transport layer). To transmit the WAVE short message (WSM) transferred from the higher layer, the WAVE short message protocol (WSMP) may be used. Additionally, the IPv6/TCP protocol may be used to process conventional IP signals. The LLC block may use the IEEE802.2 standard and distinguish the IP diagram and WSM packet.

The access layer may correspond to OSI layer 1 (physical layer) and layer 2 (data link layer). The access layer may use the PHY and MAC technology of IEEE 802.11 and may additionally use the MAC technology of IEEE 1609.4 to support vehicle communication.

The security entity and management entity may be operated, connected over the entire period.

FIG. 5 illustrates a configuration of a physical layer of a V2X transmission device according to an embodiment of the disclosure.

According to an embodiment, FIG. 5 is a block diagram illustrating the physical layer signal processing of IEEE 802.11 or ITS-G5. However, FIG. 5 illustrates a configuration of physical layer according to an embodiment of the disclosure and its application is not limited to the above-described transmission standard technology.

The physical layer processor of FIG. 5 may include a physical layer convergence protocol (PLOP) sub-layer base band signal processing part and wave shaping 5090 including at least one of a scrambler 5010, an FEC encoder 5020, an interleaver 5030, a mapper 5040, a pilot insertion block 5050, an IFFT block 5060, a guard insertion block 5070, and a preamble insertion block 5080 and a physical medium dependent (PMD) sub-layer RF band signal processing part including at least one of an I/Q modulation block 5100 and a DAC 5110. The functions of each block are described below.

The scrambler 5010 may XOR the input bit stream with a pseudo random binary sequence (PRBS), thereby randomizing it. The FEC encoder 5020 may add a redundancy to the transmission data to allow the receive part to correct errors on the transmission channel. The interleaver 5030 may interleave the input data/bit stream based on an interleaving rule so as to respond to burst errors. According to an embodiment, if deep fading or erasure is applied to QAM symbols, since each QAM symbol has been mapped with interleaved bits, an error may be prevented from occurring in the consecutive bits among all the codeword bits. The mapper 5040 may allocate the input bit word to one constellation. The pilot insertion block 5050 inserts a reference signal in a predetermined position of the signal block. Use of the reference signal allows the receiver to estimate the channel and channel distortion, such as frequency offset and timing offset.

The IFFT block 5060, i.e., the inverse waveform transform block, may transform the input signal to have enhanced transmission efficiency and flexibility, considering the system structure and the properties of the transmission channel. According to an embodiment, for OFDM systems, the IFFT block 5060 may transform frequency-domain signals into time-domain signals using an inverse FFT operation. For single carrier systems, the IFFT block 5060 may be not used or omitted. The guard insertion block 5070 may insert a guard interval between adjacent signal blocks to minimize influence by the delay spread of the transmission channel. According to an embodiment, for OFDM systems, the guard insertion block 5070 may insert a cyclic prefix into a guard interval period. The preamble insertion block 5080 may insert a predetermined type of signal, i.e., the preamble, between the transmitter and receiver to the transmission signal for the receiver to quickly and efficiently detect the target signal. According to an embodiment, for OFDM systems, the preamble insertion block 5080 may define a signal block/signal frame including a plurality of OFDM symbols and insert a preamble symbol to the start of the signal block/signal frame.

The wave shaping block 5090 may waveform-process the input baseband signal based on the properties of channel transmission. According to an embodiment, the waveform shaping block 5090 may perform square-root-raised cosine (SRRC) filtering to obtain the out-of-band emission of the transmission signal. For multi-carrier systems, the waveform shaping block 5090 may be not used or be omitted. The I/Q modulator 5100 may perform in-phase and quadrature modulation. The digital-to-analog converter (DAC) 5110 block may convert the input digital signal into an analog signal and output the analog signal. The output analog signal may be transmitted via the output antenna.

Each of the blocks shown and described in connection with FIG. 5 may be omitted or replaced with other block with the same or similar features.

An ITS system uses a decentralized congestion control (DCC) mechanism in order to perform efficient communication in a limited channel environment. The reason is that is the ITS system does not have a central processing unit such as an AP or a base station unlike other communication systems. Accordingly, each of ITS stations (ITS-S) in the ITS system should perform a channel congestion control by using a predetermined DCC mechanism.

The purpose of the decentralized congestion control (DCC) is to adjust a transmission parameter of the ITS-S under a given current wireless channel condition in order to maximize a successful reception probability in a receiver.

The DCC attempts to provide an equal access to a channel resource between neighboring ITS-Ss. The channel resources allocated to the ITS-S by the DCC should be decentralized between applications according to needs thereof. If an application requirement exceeds an allocated resource, the ITS-S should determine a priority between different messages and discard the messages. When a road traffic emergency situation occurs even during a high network utilization period, the ITS-S may still transmit a burst of message during a short period in order to maintain a safe road traffic environment. However, this exception occurs rarely and a message transmitted for this purpose is uttermost important.

FIG. 6 illustrates a DCC architecture according to an embodiment of the present disclosure. Specifically, FIG. 6 illustrates an architecture (protocol stack) of an ITS-S providing a DCC. In FIG. 6, the above descriptions in FIGS. 3 and 4 will be omitted.

Referring to FIG. 6, the DCC architecture may include a DCC facility layer entity (DCC_FAC), a DCC network layer entity (DCC_NET), a DCC access layer entity (DCC_ACC), and/or a DCC management entity (DCC_CROSS). Each entity/component may be connected through DCC interfaces (1 to 4). The DCC interface may be referred to as a service access point (SAP).

DCC_FAC as an entity included in the facility layer provides a facility layer specific DCC function. DCC_NET as an entity included in a networking and transport layer provides a networking and transport layer specific DCC function. DCC_ACC as an entity included in an access layer provides an access layer specific DCC function. DCC_CROSS as an entity included in a management layer provides a management specific function.

DCC_FAC may include some or all of the following facility layer specific DCC functions.

Control function of a load generated by messages (e.g., CAM, DENM, other messages) on a wireless channel. This load is controlled by an indication provided to a basic facility service or application that generates the message.

When the ITS-S may execute this function, a potential trigger function of channel switching.

Function to map a message priority set by the basic facility service or application to a traffic class field of the message.

DCC_NET may include some or all of the following networking and transport layer specific DCC functions.

Function to store a global DCC parameter received from another ITS-S and deliver global CBR to DCC_CROSS.

Function to disseminate a local DCC parameter to a neighboring ITS-S by inserting a value into a GN header.

As such, DCC_FAC may include at least one facility layer specific DCC function. Through this, DCC_FAC may control the load generated by each application/service at the time of generating the message. As the embodiment, DCC_FAC may control the load generated by each application/service at the time of generating the message by considering available channel resources of the ITS-S from DCC_CROSS and message generation requirements from the applications/services. For example, DCC_FAC may acquire an available CBR percentage per radio channel from DCC_CROSS, acquire a message size and a message interval from each application and service, and calculate a proposed minimum interval.

DCC_ACC may include some or all of the following access layer specific DCC functions.

CBR evaluation: Deriving a local CBR from a measured channel load (CL), for all radio channels used by the ITS-S.

DCC prioritization: Selecting a DCC queue to deliver the message according to a traffic class (TC) indicated in the message. A TC corresponding to a highest EDCA access class is mapped to a DCC queue having a highest priority and first dequeued by a DCC flow control.

DCC queue: Temporarily storing a transmit (Tx) message when the radio channel is overloaded. If a queuing time exceeds a message lifetime, the message is dropped.

DCC power control: If available, determining transmit (Tx) power associated with the message based on information provided by DCC_CROSS.

DCC flow control: Performing traffic shaping based on a parameter provided by DCC_CROSS_Access. For example, dequeuing a message having the highest priority, which is stored in the DCC queue and the dequeued message to an ITS G5 channel.

DCC_CROSS may include some or all of the following management specific DCC functions.

DCC parameter evaluation: Calculating an internal DCC parameter indicating the available channel resource based on CBR values collected by a CBR evaluation function (local CBR) and received by DCC_NET (a highest global CBR value).

DCC_CROSS_Acess: Determining DCC flow control and DCC power control parameters for each used radio channel based on the internal DCC parameter calculated by the DCC parameter evaluation function and providing the determined parameters to the DCC_ACC entity.

DCC_CROSS_Net: Returning the available resource per used radio channel to DCC_NET.

DCC_CROSS_Facilities: Determining the available channel resource for a registered application and the basic facility service by using the internal DCC parameter from the DCC parameter evaluation function. This value is provided to the DCC_FAC entity.

FIG. 7 illustrates an overview of DCC in ITS-S according to an embodiment of the present disclosure. Specifically, FIG. 7 is a diagram for schematically describing DCC processing in an ITS-S and a configuration and an operation of an ITS-S for the DCC processing.

Referring to the right side of FIG. 7, an exemplary transmission process of general data (message) in a transmitting ITS-S will be described below. First, a message (e.g., CAM, DENM, other message) is generated in the facility layer by an indication of a corresponding application or service of an application layer existing at the top. The generated message is delivered to the access layer through the networking and transport layer. The delivered message may be transmitted through the ITS-G5 radio channel via a DCC buffer. Meanwhile, a reception process of the data (message) in a receiving ITS-S may be performed as a reverse process in the transmitting ITS-S.

Meanwhile, as described above in FIG. 6, the ITS-S may include an entity for the DCC (DCC entity} for each layer. Hereinafter, the operations of each layer and the DCC entity for the DCC will be described.

First, for the DCC, the management layer receives information for the DCC from the facility layer, the networking and transport layer, and the access layer, and processes the received information in each DCC entity to provide control information (signal) to the networking and transport layer and the access layer. As described above, the management layer may include the DCC_CROSS entity, and the DCC_CROSS entity may include a DCC parameter evaluation parameter entity, a DCC_CROSS_Facilities entity, a DCC_CROSS_Net entity, and/or a DCC_CROSS_Access entity. Each operation will be described below as an example.

As illustrated, the DCC parameter evaluation entity may acquire the global CBR information from the networking and transport layer and acquire the local CBR information from the access layer, and generate the internal DCC parameter and a global DCC transmit (Tx) parameter based thereon. The generated internal DCC parameter may be delivered to each DCC entity in the management layer and the global DCC transmit parameter may be delivered to the networking and transport layer.

Further, the DCC facilities entity (DCC_CROSS_Facilities) may receive the internal DCC parameter from the DCC parameter evaluation entity and generate a message generation parameter based on the received internal DCC parameter and deliver the generated message generation parameter to the facility layer. Further, the DCC network entity (DCC_CROSS_Net) may receive the internal DCC parameter from the DCC parameter evaluation entity and generate a DCC channel resource parameter based on the received internal DCC parameter and deliver the generated DCC channel resource parameter to the networking and transport layer (e.g., a DCC header construction entity in the networking and transport layer). Further, the DCC access entity (DCC_CROSS_Access) may receive the internal DCC parameter from the DCC parameter evaluation entity and generate an access DCC parameter based on the received internal DCC parameter and deliver the generated access DCC parameter to the DCC Net entity and the access layer (e.g., a DCC flow control entity and a DCC power control entity in the access layer).

For the DCC, the access layer may check a congestion state of the channel. The congestion state of the channel may be expressed as a channel busy ratio (CBR). The CBR may be calculated as a ratio when a signal is equal to or more than a threshold by checking whether there is the signal through carrier sensing of DSRC. This may be expressed by Equation 1 below.

$$CBR_m = \frac{|N_{busy}|}{|N|}, N_{busy} \subseteq N \qquad \text{[Equation 1]}$$

In general, the CBR is measured at a period of 100 msec and 12500 samples are measured for 8 usec in one measurement. In Equation 1 above, N represents the total number of measurement times and $N_{busy}$ represents the number of times when the signal is transmitted through a corresponding channel at a threshold or more among N times.

Information on the CBR (CBR information) is collected and processed by the DCC parameter evaluation entity. In this case, the local CBR represents a CBR locally perceived by a specific ITS-S for each individual radio channel. In other words, the local CBR may be a CBR measured by the ITS-S itself. The global CBR represents a maximum value of the local CBR.

For the DCC, the facility layer may receive the message generation parameter from the DCC Facilities entity and generate the message based on the received message generation parameter. As an embodiment, the DCC Facilities entity may calculate a message transmission period according to the CBR through a state machine and deliver the message generation parameter including the transmission period to the facility layer.

FIG. 8 illustrates a method for transmitting a message based on CBR information by an ITS-S according to an embodiment of the present disclosure.

FIG. 8(a) illustrates a method in which the ITS-S transmits the message when the CBR is relatively low. For example, the embodiment of FIG. 8(a) illustrates a method in which the ITS-S transmits the message when the CBR is lower than a predetermined reference CBR.

The low CBR means that a channel usage is low. Accordingly, in this case, the ITS-S may transmit the message more frequently. In other words, the ITS-S may transmit the message at a shorter period. For example, as illustrated, the ITS-S may transmit the message five times per second at a packet rate of 5 Hz.

FIG. 8(b) illustrates a method in which the ITS-S transmits the message when the CBR is relatively high. For example, the embodiment of FIG. 8(b) illustrates a method in which the ITS-S transmits the message when the CBR is higher than the predetermined reference CBR.

The high CBR means that the channel usage is high. Accordingly, in this case, for efficient data transmission, the ITS-S should lower the transmission period of the message. For example, as illustrated, the ITS-S may transmit the message once per second at a packet rate of 1 Hz. As such, all neighboring ITS-Ss may perform normal communication by lowering the message transmission period.

As such, the ITS-S performing the DCC resolves overcrowding of the channel by adjusting a message generation period based on the collected CBR information, thereby performing smooth communication. To this end, the ITS-S may use a state based reactive DCC algorithm. This will be described below with reference to FIG. 9.

FIG. 9 illustrates a state based reactive DCC algorithm according to an embodiment of the present disclosure.

The state based reactive DCC algorithm (method) is a method for constructing the state machine based on the CBR and determining a corresponding packet rate (or transmission period) according to each state in the state machine.

FIG. 9(a) illustrates an exemplary structure of the state machine for the state based reactive DCC. Referring to FIG. 9(a), the state machine may be constituted by 5-phase states. The state machine may be constituted by a 'relaxed' state in which the CBR (or channel usage) is lowest, a 'restrictive' state in which the CBR is equal to or more than a specific value, and 'state 1 to state 3'. In the embodiment of FIG. 9(a), as the CBR increases, the state of the state machine is changed from the related state to the restrictive state.

FIG. 9(b) illustrates an example of a parameter for each state of the state machine for the state based reactive DCC. Referring to FIG. 9(b), each state is classified according to the value of the CBR and the packet rate and the transmission period are provided as the parameter for each state. For example, the 'relaxed' state in which the CBR is less than 30% has a packet rate of 10 Hz and a transmission period of 100 ms. Alternatively, the 'state 1' in which the CBR is 30 to 39% has a packet rate of 5 Hz and a transmission period of 200 ms. Alternatively, the 'state 2' in which the CBR is 40 to 49% has a packet rate of 2.5 Hz and a transmission period of 400 ms. Alternatively, the 'state 3' in which the CBR is 50 to 59% has a packet rate of 2 Hz and a transmission period of 500 ms. Alternatively, the 'restrictive state' in which the CBR is more than 60% has a packet rate of 1 Hz and a transmission period of 1000 ms.

As such, in the embodiment of FIG. 9, the state is determined according to the CBR, and the packet rate and the transmission period are determined according to the state. For example, a state corresponding to the relatively high CBR is determined to have a longer transmission period than a state corresponding to the relatively low CBR. Meanwhile, in the case of the embodiment of FIG. 9, the same transmission period is maintained in a specific state regardless of a change in CBR value. For example, the state 3 has 500 ms which is the same transmission period when the CBR value is 50 to 59.

Hereinafter, a new DCC method for flexibly operating the message according to the state of the channel will be proposed. When the state based reactive DCC algorithm of the embodiment of FIG. 9 is used, channel congestion may be controlled by adjusting the transmission period of the message according to the channel usage or a congestion level. However, the DCC method of FIG. 9 just adjusts only the transmission period of the message and does not provide a method for adjusting a structure and a size of the message. However, in some embodiments, it may be unnecessary to continuously transmit the message having the same structure and size. In this case, when the DCC method of FIG. 9 is used, an efficient operation of the channel becomes difficult. Accordingly, hereinafter, a new DCC method for adjusting the message structure in addition to the message transmission period will be proposed.

Hereinafter, for convenience of description, the DCC method of FIG. 9 is referred to as a state based reactive DCC algorithm (method) and a newly proposed DCC method is referred to as a multi-layer state based reactive DCC algorithm (method). However, this is just an exemplary use for distinguishing the DCC method for adjusting only the transmission period and the DCC algorithm (method) for adjusting both the message transmission period and the structure and both methods may be collectively referred to as the state based reactive DCC algorithm (method). In the present disclosure, the state based reactive DCC may also be abbreviated as a state based DCC.

FIG. 10 illustrates a multi-layer state based reactive DCC algorithm according to an embodiment of the present disclosure.

The multi-layer state based reactive DCC algorithm is a method for constructing a multi-layer state machine based on the CBR, determining a corresponding packet rate (or transmission period) according to each state in the state machine, and determining a corresponding message structure according to each substate in each state. In the present disclosure, the multi-layer state based reactive DCC may be abbreviated as a multi-layer state based DCC or a multi-layer DCC.

FIG. 10(a) illustrates an exemplary structure of the state machine for the multi-layer state based reactive DCC.

Referring to FIG. 10(a), the state machine may be constituted by 5-phase states like in FIG. 9(a). The state machine may be constituted by a 'relaxed' state in which the CBR (or channel usage) is lowest, a 'restrictive' state in which the CBR is equal to or more than a specific value, and 'state 1 to state 3'. In this case, as the CBR increases, the state of the state machine is changed from the relaxed state to the restrictive state.

Meanwhile, in the embodiment of FIG. 10(a), a specific state may include at least one substate unlike in FIG. 9(a). For example, as illustrated, each state 1 may include n substates SS_1 to SS_2. In this case, as the CBR increases in one state, the substate may be changed from SS_1 to SS_n.

FIG. 10(b) illustrates an example of a parameter for each state and each substate of the state machine for the multi-layer state based reactive DCC.

Referring to 10(b), each state is classified according to the value of the CBR like in FIG. 9(b). In this case, the packet rate and/or transmission period are/is provided as the parameter for each state. For example, the 'relaxed' state in which the CBR is less than 30% has a packet rate of 10 Hz and a transmission period of 100 ms. Alternatively, the 'state 1' in which the CBR is 30 to 39% has a packet rate of 5 Hz and a transmission period of 200 ms. Alternatively, the 'state 2' in which the CBR is 40 to 49% has a packet rate of 2.5 Hz and a transmission period of 400 ms. Alternatively, the 'state 3' in which the CBR is 50 to 59% has a packet rate of 2 Hz and a transmission period of 500 ms. Alternatively, the 'restrictive state' in which the CBR is more than 60% has a packet rate of 1 Hz and a transmission period of 1000 ms.

Meanwhile, in the embodiment of FIG. 10(b), the specific state may include at least one substate and each substate is classified according to the value of the CBR, unlike in FIG. 9(b). For example, the state 1 includes n substates. In this case, SS_1 of state 1 in which the CBR is 30 to 31% has a full message ratio of 0, SS_2 of state 1 in which the CBR is 31 to 32% has a full message ratio of 1, and SS_n of state 1 in which the CBR is 39 to 40% has a full message ratio of n−1. Further, similarly, state 2 and state 3 may also include at least one substate and each substate corresponds to the full message ratio. The full message ratio will be described below.

As the embodiment, the CBR value for each substate subdivides the CBR value defined by the corresponding state. This may be expressed by Equation 2 below.

$$CBR_{min} = \min(CBR_{state}), CBS_{max} = \max(CBR_{state}) \quad \text{[Equation 2]}$$

First, the minimum value (Min) and the maximum value (Max) of the CBR corresponding to the corresponding state are calculated by using Equation 2. Then, based on this, an allocable unit CBR value for each substate is determined. The corresponding unit CBR value may be expressed by Equation 3 below.

$$CBR_{ss\_unit} = \frac{CBR_{max} - CBR_{min}}{n} \quad \text{[Equation 3]}$$

Thereafter, a CBR section (range) of each substate is set to a value obtained by adding the unit CBR value to the minimum CBR value. This may be expressed by Equation 4 below.

$$CBR_{min} + (i-1) \times CBR_{ss_{unit}} < CBR_{substrate}{}^i \leq CBR_{min} + i \times CBR_{ss_{unit}} \quad \text{[Equation 4]}$$

Meanwhile, in the embodiment of FIG. 10(b), all of state 1 to state 3 include the same number (n) of substates and all CBR sections corresponding to respective substates are expressed as if the CBR sections have the same interval. However, this is just an example for convenience of description and is not limited thereto.

For example, state 1 to state 3 may include different numbers of substates. For example, state 1 may include the largest number of substates, state 3 may include the smallest number of substates, and state 2 may include an intermediate number of substates. Alternatively, state 1 and state 2 may include the same number of substates and state 3 may include the smaller number of substates than state 1 and state 2.

As another example, the interval of the CBR sections corresponding to the respective substates of state 1 is not 1 (e.g., the CBR corresponding to each substate is 30 to 31%, 31 to 32%, etc.), but may be 2 (e.g., the CBR corresponding to each substate is 30 to 32%, 32 to 34%, etc.) or may be changed for each substate (e.g., the CBR corresponding to each substate is 30 to 31%, 32 to 34%, 34 to 37%, etc.) like in FIG. 10(b).

In the embodiment of FIG. 10(b), the full message ratio Full_msg_ratio is provided as the parameter for each substate. Here, the full message ratio as information providing the transmission structure of the message may indicate a transmission ratio of a full message and a short message. As the embodiment, the full message ratio may indicate how many short messages are transmitted per full message. For example, when the full message ratio is 0, the full message ratio of 0 indicates that the full message is transmitted every time. Alternatively, when the full message ratio is 1, the full message ratio of 1 indicates that the full message is transmitted once and the short message is transmitted once. In other words, the full message ratio of 1 indicates that one short message is transmitted. Alternatively, when the full message ratio is n, the full message ratio of n indicates that the full message is transmitted once and the short message is transmitted n times. In other words, the full message ratio of n indicates that n short messages are transmitted per full message.

As such, in the embodiment of FIG. 10, each state and the substate of each state are determined according to the CBR, the transmission period (packet rate) of the message is determined according to each state, and the transmission ratio/structure (full message ratio) of the message is determined according to the substate of each state. For example, a state corresponding to a relatively high CBR is determined to have a longer transmission period than a state corresponding to a relatively low CBR and in the same state, a substate corresponding to the relatively high CBR is determined to have a higher full message ratio than a substate corresponding to the relatively low CBR. As such, in the embodiment of FIG. 10, the transmission structure of the message is adjusted according to the CBR value even in the same state, thereby more flexibly and efficiently controlling the channel congestion, unlike in the embodiment of FIG. 9.

FIG. 11 illustrates an example of an ITS message to which a multi-layer state based reactive DCC algorithm is applied according to an embodiment of the present disclosure.

In order to efficiently control the channel congestion by using the multi-layer state based reactive DCC algorithm, the ITS message should be divided into different sizes and structures and used. In the embodiment of FIG. 11, as one example of the ITS message, a Collective Perception Message (CPM) message for a Collective Perception (CP) service will be described. However, this is just an example for convenience of description and it is apparent that the multi-layer state based reactive DCC algorithm may be used in all types of ITS messages which may be divided into different sizes and/or structures and used.

The CP service may specify how the ITS-S may inform other ITS-S about locations, dynamics, and attributes of detected neighbor road users and other objects. For example, the CP service may share, through transmission of Collective Perception Messages (CPM), the information with other ITS-S.

The CPM as a message exchanged between the ITS-Ss in an ITS network may be used for generating collective perception for road users (e.g., vehicle ITS-S) and other objects detected and/or perceived by the ITS-S.

FIG. 11(a) illustrates a basic structure of a CPM message according to an embodiment of the present disclosure.

Referring to FIG. 11(a), the CPM message may include a header, an Originating Station Container (OSC), a Sensor Information Container (SIC), and/or a Perceived Object Container (POC).

The header includes a protocol version (protocolVertion) field, a message ID (messageID) field, a stationed ID field, and/or a generation time (generationDeltaTime) field. The protocol version field indicates a version of a protocol, the message ID field identifies the message, the stationed ID field identifies a station, and the generation time field indicates a time when the message is generated. The header as a common header used in the ITS message exists in a start part of the ITS message.

OSC provides basic information related to the originating ITS-S transmitting the CPM message. As the embodiment, the OSC includes a basic container and a station data part. The basic container includes originating station information commonly required. For example, the basic container includes a reference position (referencePosition) field indicating a reference position of a, originating station and a station type (stationType) field indicating the type of originating station.

The station data part includes data suitable for or specific to the corresponding station according to the type of originating station, e.g., according to whether the originating station is the vehicle ITS-S (vehicle) or a roadside ITS-S (RSU). In other words, the station data part is defined differently according to the type of station.

When the station is vehicle, the station data part may include an Originating Vehicle Container (OVC), and the OVC may include a Heading field indicating a driving direction of the vehicle, a Speed field indicating a driving speed of the vehicle, an Orientation Delta Angle field indicating an angle between the driving direction of the vehicle and a front of the vehicle, an Acceleration field indicating an acceleration of the vehicle, and/or a trailer Data field providing information on a trailer. Alternatively, when the station is the RSU, the station data part includes an Originating RSU Container (ORC). The OVC and the ORC include a station static field and/or a station dynamic field.

The SIC provides a description of at least one sensor mounted on the originating ITS-S that transmits the CPM message. The SIC may provide installation/function information of a sensor used for detecting an object and may be constructed as many as installed sensors. In other words, the SIC may include vehicle sensor fields (messages) as many as vehicle sensors installed in the vehicle according to the type of station or RSU sensor fields (messages) as many as RSU sensors installed in the RSU.

As the embodiment, the vehicle sensor message includes a sensor ID field identifying the sensor, a sensor type field indicating the type of sensor, an offset field (e.g., represented by Offset based on xOffset, yOffset, zOffset, referencePosition) indicating a position where the sensor is installed, and/or data indicating a measurement range (e.g., range, horizontalFrustumStart/End, verticalFrustumStart/End, measurement distance, horizontal measurement range, and vertical measurement range) of the sensor.

As the embodiment, the RSU sensor message includes the sensor ID field identifying the sensor, the sensor type field indicating the type of sensor, the offset field (e.g., represented by Offset based on xOffset, yOffset, zOffset, referencePosition) indicating the position where the sensor is located, and/or data indicating the measurement range (e.g., range, horizontalFrustumStart/End, verticalFrustumStart/End, measurement distance, horizontal measurement range, and vertical measurement range) of the sensor.

The vehicle sensor message and the RSU sensor message include the sensor static field and/or the sensor dynamic field.

The POC provides a description of the object perceived/detected by the sensor of the originating ITS-S. The POC includes information on the object detected through the sensor and includes Object Data parts as many as the detected objects. The object data part may include an object ID field identifying the object, data (including sensor ID information and measurement time information) indicating a sensor and a time used for detecting the object, positional information (e.g., 'xDistance','yDistance','zDistance', representing x, y, and z distances at 'referencePosition') indicating the position of the detected object, size information (e.g., 'planarObjectDimension', 'planarObjectDimension1', 'verticalObjectDimension', indicating size and height values of a horizontal plane of the object) indicating the size of the detected object, and/or state information (e.g., 'classification', 'lanePosition', 'intersectionTopologyPositoin', including an Object vehicle type, traffic lane information of the object, and intersection position information of the object) indicating the state of the object.

The object data part includes an object static field and/or an object dynamic field.

FIG. 11(b) illustrates the structure of the full message for the CPM message according to an embodiment of the present disclosure. The CPM message having the structure of the full message may also be referred to as a full message CPM message.

The full message may include both dynamic data and static stat of the CPM message. Here, the dynamic data means data changed every time the CPM message is transmitted and the static data means data that remains unchanged when the CPM message is transmitted. In other words, the dynamic data may be data having dynamic characteristics and the static data may be data having static characteristics. For example, the dynamic data may be data (e.g., vehicle position, speed, direction, etc.) which may be changed every CPM message transmitted by the same ITS-S (e.g., vehicle ITS-S) and the static data may be data (e.g., vehicle length, width, etc.) maintaining the same value in every CPM message transmitted by the same ITS-S (e.g., vehicle ITS-S) or in every CPM message within a predetermined period. The dynamic data and the static data may be classified directly by a user or automatically classified according to characteristics of data.

Referring to FIG. 11(b), the CPM message (full message CPM) operated in the structure of the full message includes the header, the OSC including the basic container, the station static field, and the station dynamic field, the SIC including the sensor static field and the sensor dynamic field, and the POC including the object static field and the object dynamic field. Each field will be described below.

The station static field may include the static data of the OSC. For example, the station static field may include length information, width information, type information, and the like of the originating ITS-S (vehicle).

The sensor static field may include the static data of the SIC. For example, the sensor static field may include ID information, type information, positional information, radius information, opening angle information, and/or quality class information of the sensor.

The object static field may include the static data of the POC. For example, the object static field may include ID information, length information, width information, height information, and/or type information of the object detected by the sensor.

The station dynamic field may include the dynamic data of the OSC. For example, the station dynamic field may include generation time information of the CPM message, and reference position information, direction information, and/or speed information of the originating ITS-S (vehicle).

The sensor dynamic field may include the dynamic data of the SIC. For example, the sensor dynamic field may include ID information and/or raw data information of the sensor.

The object dynamic data may include the dynamic data of the POC. For example, the object dynamic data may include measurement time information, ID information, sensor ID information, distance information, speed information and/or direction information of the object detected by the sensor.

FIG. 11(c) illustrates the structure of the short message for the CPM message. The CPM message having the structure of the short message may also be referred to as a short message CPM message or a dynamic only CPM message.

The short message may not include the static data of the CPM message, but may include the dynamic data. Accordingly, the short message may be referred to as a dynamic only message. Each message will be described below.

Referring to FIG. 11(c), the CPM message (dynamic only CPM) operated in the structure of the short message includes the header, the OVC including the basic container and the station dynamic field, the SIC including the sensor dynamic field, and the POC including the object dynamic field. Each field is as described above in FIG. 11(b).

As such, when the data of the CPM message is separated into the dynamic data and the static data, the dynamic data which is frequently changed and has a high importance may be frequently transmitted and the static data which is not frequently changed may be separately transmitted at a low frequency. In this case, there is an advantage in that more useful information may be more frequently transmitted while using the same channel resource compared to a method for transmitting in a single message structure.

FIG. 12 illustrates a structure of a management layer for DCC according to the present disclosure. FIG. 12(a) illustrates the structure of the management layer for the state based reactive DCC in FIG. 9 and FIG. 12(b) illustrates the structure of the management layer for the multi-layer state based reactive DCC in FIG. 10.

Referring to FIG. 12(a), the DCC parameter evaluation entity in the management layer may acquire the global CBR information and/or the local CBR information and generate the internal DCC parameter based on the acquired global CBR information and/or local CBR information. The generated internal DCC parameter may be delivered to the DCC Facilities entity (DCC_CROSS_Facilities) in the management layer.

The DCC facilities entity (DCC_CROSS_Facilities) may receive the internal DCC parameter from the DCC parameter evaluation entity and generate a message generation parameter based on the received internal DCC parameter and deliver the generated message generation parameter to the facility layer entity (e.g., DCC_FAC). In this case, an MF-GET.request primitive may be used for requesting the message generation parameter from DCC_FAC to DCC_CROSS. Further, an MF-SET.request primitive may be used for delivering the message generation parameter from DCC_CROSS to DCC_FAC. This will be described in FIG. 13.

As the embodiment, the message generation parameter may include transmission period information (T_interval) of the message. Accordingly, the facility layer receiving the message generation parameter may generate the ITS message based on the corresponding transmission period. For example, the DCC_FAC entity in the facility layer may generate an ITS message such as a CAM message based on the corresponding transmission period. This is as described above in FIG. 9.

Referring to FIG. 12(b), similarly in FIG. 12(a), the DCC parameter evaluation entity in the management layer may acquire the global CBR information and/or the local CBR information and generate the internal DCC parameter based on the acquired global CBR information and/or local CBR information and deliver the generated internal DCC parameter to the DCC Facilities entity (DCC_CROSS).

The DCC facilities entity (DCC_CROSS_Facilities) may receive the internal DCC parameter from the DCC parameter evaluation entity and generate a message generation parameter based on the received internal DCC parameter and deliver the generated message generation parameter to the facility layer entity (e.g., DCC_FAC). In this case, an MF-GET.request primitive may be used for requesting the message generation parameter from DCC_FAC to DCC_CROSS. Further, an MF-SET.request primitive may be used for delivering the message generation parameter from DCC_CROSS to DCC_FAC.

Unlike FIG. 12(a), the message generation parameter of FIG. 12(b) may include transmission period information (T_interval) and transmission structure information (Full_msg_ratio) of the message. For example, the message generation parameter may further include full message ratio information. Accordingly, the facility layer receiving the message generation parameter may generate CPM messages having different periods and structures based on the corresponding transmission period and transmission structure. This is as described above in FIG. 10.

FIG. 13 illustrates a structure of an interface between a management layer and a facility layer for DCC according to the present disclosure. FIG. 13(a) illustrates the structure of the interface between the management layer and the facility layer for the state based reactive DCC in FIG. 9 and FIG. 13(b) illustrates the structure of the interface between the management layer and the facility layer for the multi-layer state based reactive DCC in FIG. 10.

In the present disclosure, the interface between the management layer and the facility layer may be referred to as a Management-Facilities Service Access Point (MF-SAP). Hereinafter, the structure of the MF-SAP for the state based reactive DCC in FIG. 9 and the structure of the MF-SAP for the multi-layer state based reactive DCC in FIG. 10 will be described by referring to FIGS. 13(a) and 13(b), respectively.

Referring to FIG. 13(a), a primitive delivered through the MF-SAP may include an MF-GET primitive (e.g., MF-GET.request) and an MF-SET primitive (e.g., MF-SET.request).

Here, the MF-GET primitive may allow searching the parameter from the facility layer. In other words, the MF-GET primitive may be used for the management layer to search the parameter from the facility layer. The MF-GET primitive may be used for the management layer to request specific parameter information to the facility layer.

The MF-SET primitive may allow setting the parameter in the facility layer. In other words, the MF-SET primitive may be used for the management layer to set the parameter in the facility layer. The MF-SET primitive may be used for the facility layer to deliver/return the specific parameter information requested to the management layer.

Through delivery of the primitives, the parameter/data may be exchanged between the management layer and the facility layer. The parameters of the MF-GET and MF-SET primitives are shown in Table 1 below.

Table 1 shows an example of the parameters of the MF-GET and MF-SET primitives.

TABLE 1

| Name | ASN.1 type | Valid range | Description |
|---|---|---|---|
| FAC-ID | INTEGER | Integer number | Unique identifier of the Facilities Interface |
| CommandRef | INTEGER | Integer number | Unique cyclic reference number of request |
|  | INTEGER | 0 to 255 | Number of subsequent F-Param elements |
| F-Param. No | CHOICE | 0 to 255 | See Table 2 |
| F-Param. Value |  | Depends on F-Param. No |  |

Referring to Table 1, FAC-ID indicates a unique ID for identifying a facility interface or the facility layer. CommandRef indicates a unique cyclic reference number of a command or the request. F-Param.No and F-Param.Value indicate a number and a value of a parameter which is to be actually delivered. In this case, F-Param.Value depends on F-Param.No. F-Param.No and F-Param.Value may be referred to as F-Param elements and a parameter indicating the number of subsequent F-Param elements may be included in the MF-GET and MF-SET primitives. Exemplary descriptions of F-Param.No and F-Param.Value are shown in Table 2 below.

TABLE 2

| F-Param. No | Name of F-Param | Access | Format |
|---|---|---|---|
| 0 | Channel Number | R | 1 octet, Range from 1 to 7 |
| 1 | Total available resource | R | 2 octets, mapped to reciprocal value of $CBR_a$ |
| 2 | Average message size | W/R | 1 octet, granularity is 1 OFDM symbol length = 8 µs |
| 3 | Available resource | W/R | 2 octets, mapped to reciprocal value of $ACR_q$ |

TABLE 2-continued

| F-Param. No | Name of F-Param | Access | Format |
|---|---|---|---|
| 4 | Minimum message interval | W/R | 2 octets, in ms |

Referring to a list of F-Param of Table 2, when the value of F-Param.No is 0, the parameter delivered through MF-SAP may indicate a channel number. Accordingly, in this case, a radio channel number in an ITS-G5A, G5B, or G5D band may be identified by the value of F-Param.Value.

Alternatively, when the value of F-Param.No is 1, the parameter delivered through MF-SAP may indicate a total available resource. Accordingly, in this case, a total available CBR percentage for a selected channel may be indicated by the value of F-Param.Value.

Alternatively, when the value of F-Param.No is 2, the parameter delivered through MF-SAP may indicate an average message size. Accordingly, in this case, the average message size for an application (e.g., CPM application) may be indicated by the value of F-Param.Value.

Alternatively, when the value of F-Param.No is 3, the parameter delivered through MF-SAP may indicate an available resource. Accordingly, in this case, the available channel resource for the application may be indicated by the value of F-Param.Value.

Alternatively, when the value of F-Param.No is 4, the parameter delivered through MF-SAP may indicate a minimum message interval (available resource). In other words, the parameter may indicate the transmission period of the message. Accordingly, in this case, the minimum message interval (transmission period) for the application may be indicated by the value of F-Param.Value.

Referring to FIG. 13(b), the primitive delivered through the MF-SAP may include an MF-GET primitive (e.g., MF-GET.request) and an MF-SET primitive (e.g., MF-SET.request) similarly in FIG. 13(a). The parameters of the MF-GET and MF-SET primitives are as described above in Table 1. However, in the embodiment of FIG. 13(b), a parameter/information (e.g., full message ratio (Full_msg_ratio) information) indicating the transmission structure of the message should be further delivered through MF-SAP, unlike in the embodiment in FIG. 13(a). Accordingly, the value for the Full_msg_ratio should be added onto the list of F-Param of Table 2. This will be described in Table 3 below.

TABLE 3

| F-Param. No | Name of F-Param | Access | Format |
|---|---|---|---|
| 0 | Channel Number | R | 1 octet, Range from 1 to 7 |
| 1 | Total available resource | R | 2 octets, mapped to reciprocal value of CBR |
| 2 | Average message size | W/R | 1 octet, granularity is 1 OFDM symbol length = 8 µs |
| 3 | Available resource | W/R | 2 octets, mapped to reciprocal value o: $ACR_q$ |
| 4 | Minimum message interval | W/R | 2 octets, in ms |

TABLE 3-continued

| F-Param. No | Name of F-Param | Access | Format |
|---|---|---|---|
| 5 | Full message ratio | W/R | 1 octet, range from 1 to n |

Referring to the list of F-Param of Table 3, when the value of F-Param.No is 5, the parameter delivered through MF-SAP may indicate the full message ratio. The parameter may indicate the transmission structure of the message. Accordingly, in this case, the full message ratio for the application (e.g., CPM application) may be indicated by the value of F-Param.Value.

FIG. 14 illustrates a structure of a facility layer for DCC according to an embodiment of the present disclosure. FIG. 14(a) illustrates the structure of the facility layer for the state based reactive DCC in FIG. 9 and FIG. 14(b) illustrates the structure of the facility layer for the multi-layer state based reactive DCC in FIG. 10.

Referring to FIG. 14(a), the DCC_FAC entity of the facility layer may generate the ITS message by using the message generation parameter delivered from the management layer. In this case, the message generation parameter may include transmission period information (minimum message interval) of the message. Accordingly, DCC_FAC may determine the message transmission period based on the transmission period information and generate the ITS message such as the CAM message at the corresponding message transmission period.

Referring to FIG. 14(b), the DCC_FAC entity of the facility layer may generate the ITS message by using the message generation parameter delivered from the management layer. Unlike in the embodiment of FIG. 14(a), the message generation parameter may include the transmission period information and the transmission structure information (e.g., full message ratio information) of the message. Accordingly, DCC_FAC may determine the message transmission period and the message transmission structure based on the transmission period information and the transmission structure information and generate the ITS message such as the CPM message at the corresponding message transmission period and in the message transmission structure. This will be described below with reference to FIG. 15.

FIG. 15 illustrates a method in which an ITS-S using multi-layer state based reactive DCC transmits/receives an ITS message according to an embodiment of the present disclosure.

In the embodiment of FIG. 15, the ITS-S assumes that the multi-layer state based reactive DCC algorithm is used for the DCC. In this case, it is assumed that the minimum message interval indicating the transmission period of the message is $T_{interval}$ and the full message ratio (Full_msg_ratio) indicating the transmission structure of the message is 2.

Referring to FIG. 15, the transmitting (Tx) ITS-S may generate and transmit the ITS message every period, i.e., at times t1, t2, and t3 to t7. The receiving (Rx) ITS-S may receive the ITS message.

As described above, the transmission period ($T_{interval}$) of the message may be adjusted by the CBR value. Meanwhile, since the full message ratio is 2, the transmitting ITS-S may generate and transmit two short messages per full message. For example, as illustrated, the transmitting ITS-S may transmit the full message at the time t1 and transmit the short message at the times t2 and t3. As such, the ITS-S transmits a small-sized message including only information which is important or is frequently changed at a specific time while using the same transmission period to increase efficiency of channel use.

FIG. 16 illustrates a method in which an ITS-S using multi-layer state based reactive DCC generates an ITS message through facility layer processing according to an embodiment of the present disclosure.

First, the facility layer of the ITS or ITS-S may initialize a system (S16010).

The facility layer of the ITS or ITS-S may receive the message generation parameter from the management layer through MF-SAP (S16020). In this case, the message generation parameter may include information on the transmission period ($T_{interval}$) and the transmission structure (e.g., full message ratio (full_msg_ratio)) of the message for the DCC.

The facility layer of the ITS or ITS-S may determine the transmission period of the message and the structure of the message transmitted at the corresponding period based on the transmission period information and the transmission structure information (S16030).

The facility layer of the ITS or ITS-S may determine whether the corresponding period is a period at which the full message is transmitted (S16040).

When the corresponding period is the period at which the full message is transmitted, the facility layer of the ITS or ITS-S may generate the full message (S16050). In this case, the facility layer of the ITS or ITS-S first generates the short message (e.g., short CPM message) and additionally generates an extended message (e.g., extended CPM message) to generate the full message. Exemplary structures of the short message and the full message are as described above in FIG. 11.

When the corresponding period is not the period at which the full message is transmitted, the facility layer of the ITS or ITS-S may generate the short message (S16060).

The generated message may be generated and transmitted as the radio signal through processing of the networking and transport layer and processing of the access layer.

FIG. 17 illustrates a first embodiment in which an ITS-S using multi-layer state based reactive DCC transmits an ITS message according to a state and a substate according to an embodiment of the present disclosure. In the embodiment of FIG. 17, it is assumed that the ITS message is the CPM message of FIG. 11.

Specifically, FIG. 17(a) illustrates an exemplary structure of a state machine for multi-layer state based reactive DCC and an example of a parameter for each state/substate of the state machine. FIG. 17(b) illustrates a method in which the ITS-S transmits the ITS message based on the transmission period and the transmission structure determined according to the state and the substate. In FIG. 17, a description duplicated with contents described above in FIG. 10 will be omitted.

Referring to FIG. 17(a), when the CBR ratio is 30 to 31%, the ITS-S may determine state 1 and SS1 as the state and the substate for the DCC. In this case, the transmission period ($T_{interval}$) and the transmission structure (Full_msg_ratio) corresponding to state 1 and SS1 are 200 ms and 0, respectively.

Referring to FIG. 17(b), the ITS-S may transmit the CPM message based on the determined transmission period and transmission structure. As illustrated, the ITS-S may transmit the CPM message at the transmission period of 200 ms. As illustrated, the ITS-S may transmit the CPM message at the times t1 to t7. Further, the ITS-S may transmit the CPM message at the full message ratio of 0. In other words, the ITS-S may transmit the full message at each of the times t1 to t7. As described above, the full message may include the short CPM message (short message) and the extended CPM message.

FIG. 18 illustrates a second embodiment in which an ITS-S using multi-layer state based reactive DCC transmits an ITS message according to a state and a substate according to an embodiment of the present disclosure. In the embodiment of FIG. 18, it is assumed that the ITS message is the CPM message of FIG. 11.

Specifically, FIG. 18(a) illustrates an exemplary structure of a state machine for multi-layer state based reactive DCC and an example of a parameter for each state/substate of the state machine. FIG. 18(b) illustrates a method in which the ITS-S transmits the ITS message based on the transmission period and the transmission structure determined according to the state and the substate. In FIG. 18, a description duplicated with the contents described above in FIGS. 10 and 17 will be omitted.

Referring to FIG. 18(b), when the CBR ratio is 31 to 32%, the ITS-S may determine state 1 and SS2 as the state and the substate for the DCC. In this case, the transmission period ($T_{interval}$) and the transmission structure (Full_msg_ratio) corresponding to state 1 and SS2 are 200 ms and 1, respectively.

Referring to FIG. 18(b), the ITS-S may transmit the CPM message based on the determined transmission period and transmission structure. As illustrated, the ITS-S may transmit the CPM message at the transmission period of 200 ms as illustrated in FIG. 17(b). In other words, the ITS-S may transmit the CPM message at the times t1 to t7. Further, the ITS-S may transmit the CPM message at the full message ratio of 1. As illustrated, the ITS-S may transmit the full message at the times t1, t3, t5, and t7 and transmit the short message at the times t2, t4, and t6, unlike in FIG. 17(b). In other words, one short message may be transmitted per full message. As described above, the full message may include the short CPM message (short message) and the extended CPM message.

FIG. 19 illustrates a third embodiment in which an ITS-S using multi-layer state based reactive DCC transmits an ITS message according to a state and a substate according to an embodiment of the present disclosure. In the embodiment of FIG. 19, it is assumed that the ITS message is the CPM message of FIG. 11.

Specifically, FIG. 19(a) illustrates an exemplary structure of a state machine for multi-layer state based reactive DCC and an example of a parameter for each state/substate of the state machine. FIG. 19(b) illustrates a method in which the ITS-S transmits the ITS message based on the transmission period and the transmission structure determined according to the state and the substate. In FIG. 19, a description duplicated with the contents described above in FIGS. 10, 17, and 18 will be omitted.

Referring to FIG. 19(a), when the CBR ratio is 40 to 41%, the ITS-S may determine state 2 and SS1 as the state and the substate for the DCC. In this case, the transmission period ($T_{interval}$) and the transmission structure (Full_msg_ratio) corresponding to state 2 and SS1 are 400 ms and 0, respectively.

Referring to FIG. 19(b), the ITS-S may transmit the CPM message based on the determined transmission period and transmission structure. As illustrated, the ITS-S may transmit the CPM message at the transmission period of 400 ms which is a longer transmission period unlike in FIG. 17(b). In other words, the ITS-S may transmit the CPM message at the times t1, t3, t5, and t7. Further, the ITS-S may transmit the CPM message at the full message ratio of 0. In other words, the ITS-S may transmit the CPM message at all of the times t1, t3, t5, and t7. As described above, the full message may include the short CPM message (short message) and the extended CPM message.

FIG. 20 illustrates a fourth embodiment in which an ITS-S using multi-layer state based reactive DCC transmits an ITS message according to a state and a substate according to an embodiment of the present disclosure. In the embodiment of FIG. 20, it is assumed that the ITS message is the CPM message of FIG. 11.

Specifically, FIG. 20(a) illustrates the structure of the state machine for multi-layer state based reactive DCC and the parameter for each state/substate of the state machine. FIG. 20(b) illustrates a method in which the ITS-S transmits the ITS message based on the transmission period and the transmission structure determined according to the state and the substate. In FIG. 20, a description duplicated with the contents described above in FIGS. 10, and 17 to 19 will be omitted.

Referring to FIG. 20(a), when the CBR ratio is 42 to 43%, the ITS-S may determine state 2 and SS3 as the state and the substate for the DCC. In this case, the transmission period ($T_{interval}$) and the transmission structure (Full_msg_ratio) corresponding to state 2 and SS3 are 400 ms and 2, respectively.

Referring to FIG. 20(b), the ITS-S may transmit the CPM message based on the determined transmission period and transmission structure. As illustrated, the ITS-S may transmit the CPM message at the transmission period of 400 ms as illustrated in FIG. 19(b). In other words, the ITS-S may transmit the CPM message at the times t1, t3, t5, and t7. Further, the ITS-S may transmit the CPM message at the full message ratio of 2. As illustrated, the ITS-S may transmit the full message at the times t1 and 7 and transmit the short message at the times t3 and t5, unlike in FIG. 19(b). In other words, two short messages may be transmitted per full message. As described above, the full message may include the short CPM message (short message) and the extended CPM message.

FIG. 21 illustrates a configuration of a V2X communication device according to an embodiment of the present disclosure. As described above, the V2X device may correspond to the ITS-S or included in the ITS-S.

In FIG. 21, a V2X communication device 21000 may include at least one communication unit 21010, a processor 21020, and a memory 21030.

The communication unit 21010 is connected to the processor 21020 to transmit/receive a radio signal. The communication unit 21010 may transmit a signal by upconverting data received from the processor 21020 to a transmission/reception band or downconvert a received signal. The communication unit 21010 may implement at least one operation between a physical layer or an access layer.

The communication unit 21010 may include multiple sub RF units for communicating in accordance with multiple communication protocols. As the embodiment, the communication unit 21010 may perform data communication based on Dedicated Short Range Communication (DSRC), IEEE 802.11 and/or 802.11p standard-based communication technology, ITS-G5 wireless communication technology based on physical transmission technology of the IEEE 802.11 and/or 802.11p standards, 2G/3G/4G (LTE)/5G wireless cellular communication technology including satellite/broadband wireless mobile communication, broadband terrestrial digital broadcasting technology such as DVB-T/T2/

ATSC, GPS technology, IEEE 1609 WAVE technology, and the like. The communication unit 21010 may include a plurality of transceivers implementing each communication technology.

The communication unit 21010 may include the plurality of transceivers and one transceiver may communication in CCH and other transceivers may communicate in SCH. The communication unit 21010 may perform a multi-channel operation by using the plurality of transceivers.

The processor 21020 is connected with the RF unit 21030 to implement the operations of the layers according to the ITS system or the WAVE system. The processor 21020 may be configured to perform operations in accordance with various embodiments of the present disclosure in accordance with the aforementioned drawings and descriptions. Further, at least one of a module, data, a program, or software that implements the V2X communication device 21000 according to various embodiments of the present disclosure may be stored in the memory 21010 and executed by the processor 21020.

The memory 21010 is connected with the processor 21020 to store various pieces of information for driving the processor 21020. The memory 21010 is included in the processor 21020 or installed outside the processor 21020 to be connected with the processor 21020 by a known means.

FIG. 22 illustrates a method for transmitting a V2X message by a V2X communication device according to an embodiment of the present disclosure. As described above, the V2X device may correspond to the ITS-S or included in the ITS-S. Further, the V2X message may be referred to as the ITS message. A detailed description of each step follows a description in each drawing. In the embodiment of FIG. 22, the V2X communication device may use the multi-layer state based reactive DCC algorithm as an algorithm for DCC. In FIG. 22, a description duplicated with the above descriptions in FIGS. 1 to 21 will be omitted.

Referring to FIG. 22, the V2X communication device may acquire CBR information indicating a congestion state of a channel (S22010).

The V2X communication device may determine a state and substate of a channel for a decentralized congestion control (DCC) based on the CBR information (S22020). To this end, the state machine of FIG. 10(*b*) may be used.

The V2X communication device may generate transmission period information and transmission structure information based on the state and the substate (S22030). Here, the transmission period information may indicate a transmission period of the V2X message and the transmission structure information may indicate a structure of the V2X message transmitted in the transmission period. For example, the transmission structure information may be the full message ratio information.

As the embodiment, the V2X communication device may generate the transmission period information by determining a predetermined transmission period corresponding to the state and generate the transmission structure information by determining a predetermined transmission structure corresponding to the substate in the state. To this end, the table of FIG. 10(*b*) may be used.

As the embodiment, the structure of the V2X message includes a full message structure including dynamic data and static data of the V2X message and a short message structure including only the dynamic data. The static data and the dynamic data are as described in FIG. 11.

As the embodiment, the transmission structure information may provide a transmission ratio indicating how many times a V2X message of the short message structure is transmitted per transmission of a V2X message of the full message structure. The transmission structure information may be referred to as full message ratio information.

The V2X communication device may generate the V2X message based on the transmission period information and the transmission structure information (S22040). As the embodiment, the V2X communication device may transmit the V2X message of the full message structure and the V2X message of the short message structure at the transmission period based on the transmission ratio.

Meanwhile, generating the transmission period information and the transmission structure information may be processed by a management entity (e.g., DOC_CROSS entity) of the V2X communication device. Further, generating the V2X message may be processed by a facility layer (e.g., DCC_FAC entity) of the V2X communication device.

As the embodiment, the facility layer entity (e.g., DCC_FAC entity) may deliver a request primitive (e.g., MF-REQ primitive) for requesting the transmission period information and the transmission structure information to the management entity (e.g., DCC_CROSS entity) through MF-SAP. Through this, the management entity may generate or determine the transmission period information and the transmission structure information.

Further, the facility layer entity may deliver a primitive (e.g., MF-SET primitive) for delivering the transmission period information and the transmission structure information to the facility layer entity (e.g., DCC_FAC entity) through MF-SAP. Through this, the facility layer entity may acquire or receive the transmission period information and the transmission structure information and generate the V2X message based on the acquired or received transmission period information and transmission structure information.

As the embodiment, the request primitive may include ID information for identifying the facility layer and information on a parameter requested through the request primitive and the parameter information may include the transmission period information and the transmission structure information. In this case, the ID information may be the FAC-ID and the parameter information may be the F-Param element.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

MODE FOR INVENTION

It will be understood by those skilled in the art that various changes and modifications can be made therein without departing from the spirit or scope of the invention. Accordingly, it is intended that the present disclosure cover the modifications and variations of the present disclosure provided they come within the scope of the appended claims and their equivalents.

In the present disclosure, all apparatus and method inventions are herein mentioned and descriptions of both apparatus and method inventions can be supplemented and applied to each other.

Various embodiments are described in a best mode for carrying out the present disclosure.

INDUSTRIAL APPLICABILITY

The present disclosure is used in a series of V2X communication fields.

It will be apparent to those skilled in the art that various changes and modifications can be made therein without departing from the spirit or scope of the present disclosure. Accordingly, it is intended that the present disclosure cover the modifications and variations of the present disclosure provided they come within the scope of the appended claims and their equivalents.

The invention claimed is:

1. A method for transmitting, by a vehicle-to-everything (V2X) communication device, a V2X message, the method comprising:
    acquiring channel busy ratio (CBR) information indicating a congestion state of a channel;
    determining a state and a substate of a channel for a distributed congestion control (DCC) based on the CBR information;
    generating transmission period information and transmission structure information for the V2X message based on the state and substrate the substate; and
    generating the V2X message based on the transmission period information and the transmission structure information,
    wherein the transmission period information indicates a transmission period of the V2X message and the transmission structure information indicates a structure of the V2X message transmitted in the transmission period.

2. The method of claim 1, wherein the generating of the transmission period information and the transmission structure information includes:
    generating the transmission period information by determining a predetermined transmission period corresponding to the state; and
    generating the transmission structure information by determining a predetermined transmission structure corresponding to the substate in the state.

3. The method of claim 1, wherein the structure of the V2X message includes a full message structure including dynamic data and static data of the V2X message and a short message structure including only the dynamic data.

4. The method of claim 3, wherein the transmission structure information provides a transmission ratio indicating how many times a V2X message of the short message structure is transmitted per transmission of a V2X message of the full message structure.

5. The method of claim 4, wherein the generating of the V2X message includes transmitting the V2X message of the full message structure and the V2X message of the short message structure in the transmission period based on the transmission ratio.

6. The method of claim 1, further comprising:
    delivering, by a facility layer entity, a request primitive for requesting the transmission period information and the transmission structure information to a management layer entity.

7. The method of claim 6, wherein the request primitive includes ID information for identifying a facility layer and parameter information for a parameter requested through the request primitive, and the parameter information includes the transmission period information and the transmission structure information.

8. A vehicle-to-everything (V2X) communication device for transmitting a V2X message, the V2X communication device comprising:
    at least one transceiver configured to transmit or receive a V2X message; and
    a processor configured to control the transceiver,
    wherein the processor is further configured to:
    acquire channel busy ratio (CBR) information indicating a congestion state of a channel;
    determine a state and a substate of a channel for a distributed congestion control (DCC) based on the CBR information;
    generate transmission period information and transmission structure information for the V2X message based on the state and the substate; and
    generate the V2X message based on the transmission period information and the transmission structure information, and
    wherein the transmission period information indicates a transmission period of the V2X message and the transmission structure information indicates a structure of the V2X message transmitted in the transmission period.

9. The V2X communication device of claim 8, wherein the processor is further configured to generate the transmission period information and the transmission structure information by:
    generating the transmission period information by determining a predetermined transmission period corresponding to the state; and
    generating the transmission structure information by determining a predetermined transmission structure corresponding to the substate in the state.

10. The V2X communication device of claim 8, wherein the structure of the V2X message includes a full message structure including dynamic data and static data of the V2X message and a short message structure including only the dynamic data.

11. The V2X communication device of claim 10, wherein the transmission structure information provides a transmission ratio indicating how many times a V2X message of the short message structure is transmitted per transmission of a V2X message of the full message structure.

12. The V2X communication device of claim 11, wherein the processor is further configured to generate the V2X message by transmitting the V2X message of the full message structure and the V2X message of the short message structure in the transmission period based on the transmission ratio.

13. The V2X communication device of claim 8, wherein the processor is further configured to deliver, by a facility layer entity, a request primitive for requesting the transmission period information and the transmission structure information to a management layer entity.

14. The V2X communication device of claim 13, wherein the request primitive includes ID information for identifying a facility layer and parameter information for a parameter requested through the request primitive, and the parameter information includes the transmission period information and the transmission structure information.

* * * * *